(12) United States Patent
Haas et al.

(10) Patent No.: US 10,236,993 B2
(45) Date of Patent: Mar. 19, 2019

(54) TRANSMISSION SCHEME FOR COMMUNICATIONS SYSTEMS

(71) Applicant: The University Court of the University of Edinburgh, Edinburgh (GB)

(72) Inventors: Harald Haas, Edinburgh (GB); Dobroslav Tsonev, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 94 days.

(21) Appl. No.: 14/917,864

(22) PCT Filed: Sep. 12, 2014

(86) PCT No.: PCT/GB2014/052781
§ 371 (c)(1),
(2) Date: Mar. 9, 2016

(87) PCT Pub. No.: WO2015/036786
PCT Pub. Date: Mar. 19, 2015

(65) Prior Publication Data
US 2016/0226594 A1    Aug. 4, 2016

(30) Foreign Application Priority Data
Sep. 13, 2013    (GB) .................. 1316361.3

(51) Int. Cl.
*H04B 10/60* (2013.01)
*H04B 10/58* (2013.01)
(Continued)

(52) U.S. Cl.
CPC .......... *H04B 10/58* (2013.01); *H04B 10/516* (2013.01); *H04B 10/60* (2013.01); *H04L 5/0044* (2013.01); *H04L 5/0062* (2013.01)

(58) Field of Classification Search
CPC .. H04B 10/504; H04B 10/505; H04B 10/564; H04B 10/506; H04B 10/572;
(Continued)

(56) References Cited

U.S. PATENT DOCUMENTS 3,688,036 A  *  8/1972  Bland ................ H04L 25/4925
375/356
4,679,188 A  *  7/1987  Fukuda ................ H04L 5/1492
370/286

(Continued)

FOREIGN PATENT DOCUMENTS

CN    101741797 A    6/2010
CN    102291360 A    12/2011
(Continued)

OTHER PUBLICATIONS

Armstrong, J., et al., "Power efficient Optical OFDM", *Electronics Letters*, Mar. 16, 2006, pp. 370-372, vol. 42, No. 6, IET Journals, UK.

(Continued)

*Primary Examiner* — Ted M Wang
(74) *Attorney, Agent, or Firm* — Alston & Bird LLP

(57) ABSTRACT

A transmission apparatus that produces, generates and/or transmits a unipolar signal representative of an original bipolar signal having one or more data frames, wherein each of the one or more frames of the original bipolar signal are converted into and/or transmitted as a plurality of unipolar portions, frames or frame portions of one or more information streams; and the transmission apparatus is configured to concurrently transmit the one or more information streams and at least one other information stream. Preferably, the different information streams are transmitted simultaneously on the same channel/link. Advantageously, one or more of the information streams are optionally arranged such that the interference due to the at least one other information stream (Continued)

on the at least one information stream does not adversely affect the information carried in the at least one information stream. The present invention also includes a corresponding receiver, system device and methods.

43 Claims, 10 Drawing Sheets

(51) Int. Cl.
*H04B 10/516* (2013.01)
*H04L 5/00* (2006.01)
(58) Field of Classification Search
CPC ...... H04B 10/58; H04B 10/516; H04B 10/60; H04L 5/0044; H04L 5/0062
See application file for complete search history.

(56) References Cited

U.S. PATENT DOCUMENTS

| | | | | |
|---|---|---|---|---|
| 4,750,167 | A | * | 6/1988 | Meyer ............... H04B 14/04 370/498 |
| 2009/0175365 | A1 | | 7/2009 | Jun, II |

FOREIGN PATENT DOCUMENTS

| | | |
|---|---|---|
| CN | 102299894 A | 12/2011 |
| EP | 0692873 A1 | 1/1996 |
| EP | 1696586 A1 | 8/2006 |
| GB | 2496379 A | 5/2013 |
| JP | 2006-148829 A | 6/2006 |
| JP | 2010-130030 A | 6/2010 |
| WO | WO 2002/025857 A1 | 3/2002 |
| WO | WO 2007/064165 A1 | 6/2007 |
| WO | WO 2010/062094 A2 | 6/2010 |
| WO | WO 2011/082713 A2 | 7/2011 |
| WO | WO 2013/064835 A2 | 5/2013 |

OTHER PUBLICATIONS

Fernando, N., et al., "Flip-OFDM for Unipolar Communication Systems", *IEEE Transactions on Communications*, Dec. 2012, pp. 3726-3733, vol. 60, No. 12, IEEE, USA.
Fernando, N., et. al., "Flip-OFDM for Optical Wireless Communications", in *Information Theory Workshop (ITW)*, IEEE, Oct. 16-20, 2011, pp. 5-9, Paraty, Brazil, IEEE.
Lee, S.C.J., et al., "PAM-DMT for Intensity Modulated and Direct-Detection Optical Communication Systems", *IEEE Photonics Technology Letters*, Dec. 1, 2009, pp. 1749-1751, vol. 21, No. 23, IEEE, USA.
Tsonev, D., et al., "Enhanced Subcarrier Index Modulation (SIM) OFDM", *Globecom Workshops*, Dec. 5, 2011, pp. 728-732, IEEE, USA.
Tsonev, D., et al., "Novel Unipolar Orthogonal Frequency Division Multiplexing", *Proc. of the Vehicular Technology Conference (VTC Spring)*, IEEE, May 6-9 2012, 5 pages, Yokohama, Japan, IEEE.
International Searching Authority, International Search Report and Written Opinion for International Application No. PCT/GB2014/052781, dated Feb. 20, 2015, 12 pages, The Netherlands.
State Intellectual Property Office of the P.R.C., First Office Action for Application No. 201480061974.9, dated Jun. 20, 2017, 22 pages, China.

* cited by examiner

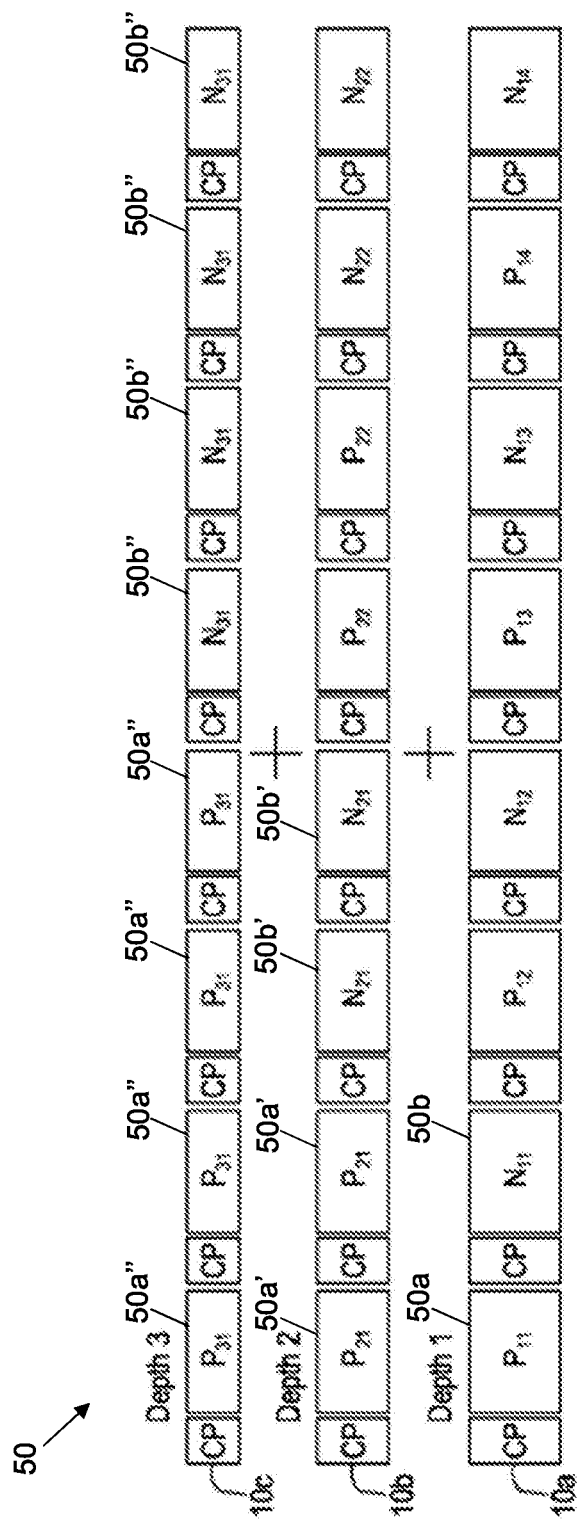

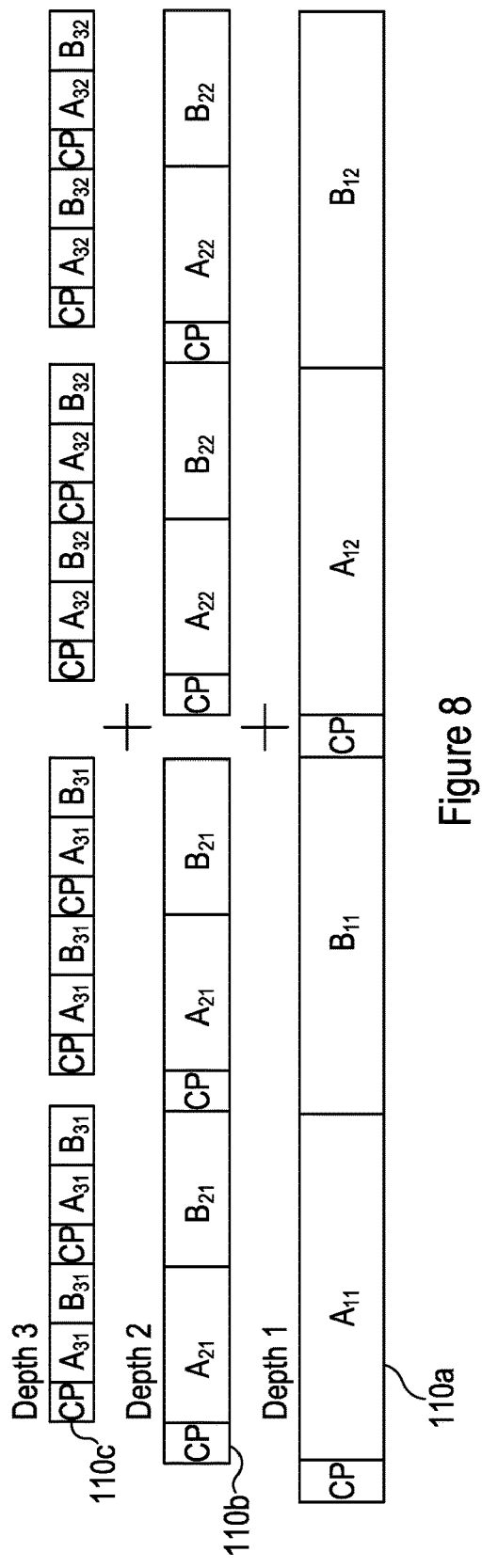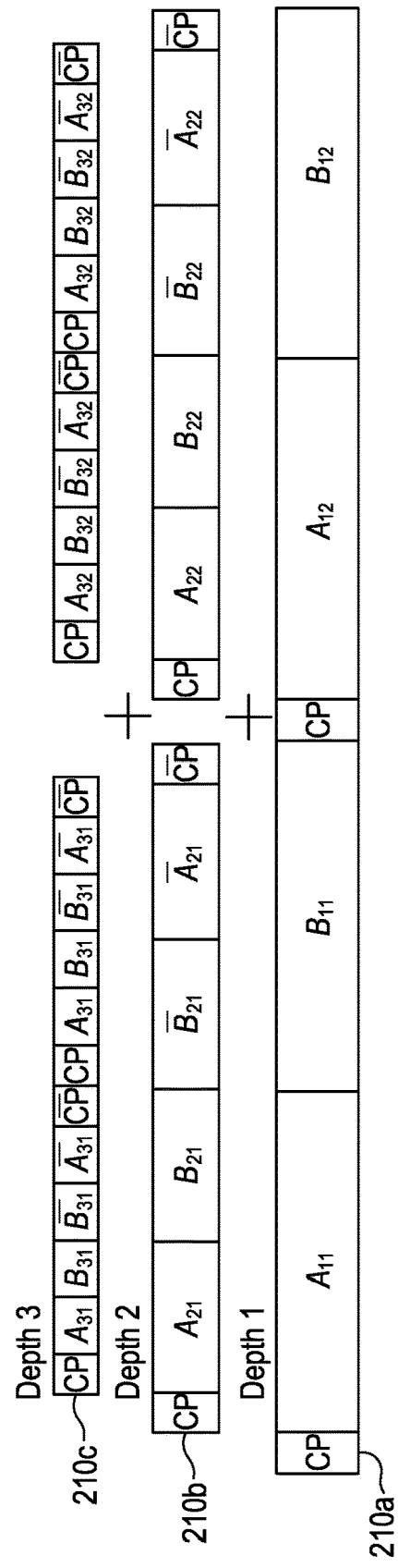

TRANSMISSION SCHEME FOR COMMUNICATIONS SYSTEMS

CROSS REFERENCE TO RELATED APPLICATIONS

This application is a National Stage Application, filed under 35 U.S.C. § 371, of International Application No. PCT/GB2014/052781, filed Sep. 12, 2014, which claims priority to United Kingdom Application No. 1316361.3, filed Sep. 13, 2013, the contents of both of which are hereby incorporated by reference in their entirety.

BACKGROUND

Related Field

The present invention relates to a communication system for transmitting unipolar signals, along with an associated transmitter, receiver and methods of transmitting and receiving unipolar signals.

DESCRIPTION OF RELATED ART

Optical wireless communication is considered to be a promising alternative or complimentary technology for addressing the increasing demand for wireless data communication traffic and the bandwidth limitation with current mobile communications systems.

Optical wireless communication can advantageously use low cost front end components such as light emitting diodes (LEDs) and photodiodes (PDs). However, LEDs generally emit light incoherently such that phase and amplitude are difficult to reliably modulate or detect. AS such, optical wireless communications systems are often realised as intensity modulation/direct detection systems that may employ, for example, techniques such as on-off keying (OOK) pulse position modulation (PPM) and pulse amplitude modulation (M-PAM).

However, as transmission rates increase, inter-symbol interference may become increasingly problematic. In such circumstances, it would be beneficial to employ a modulation scheme more akin to orthogonal frequency division multiplexing (OFDM). However, OFDM generally produces complex valued time domain samples, whereas intensity modulation requires real unipolar signals.

The conventional way to create real signals is to impose a Hermitian symmetry during an inverse fast Fourier transform step in the modulation process. An alternative approach is to make a complex signal in the time domain real by splitting the real and the imaginary parts and transmitting them in two separate streams.

Once the signal is made real, the bipolar signal can be converted into a unipolar signal. A number of approaches for obtaining a unipolar signal that is suitable for use in optical wireless communications systems have been proposed. One approach is to use DC-biased optical OFDM (DCO-OFDM) which involves adding a bias value to all of the samples, wherein the bias value is sufficient to make all of the samples non-negative. However, this approach significantly increases the power dissipation of the signal. Some other examples of techniques that provide a unipolar signal include unipolar orthogonal frequency division multiplexing (U-OFDM), asymmetrically clipped optical OFDM (ACO-OFDM), pulse amplitude modulated discrete multi-tone modulation (PAM-DMT), Flip-OFDM and the like. U-OFDM is described in published Patent applications GB2496379 and WO/2013/064835 and in "Novel Unipolar Orthogonal Frequency Division Multiplexing" by D. Tsonev, S. Sinanović and H. Haas, *Proc. Of the Vehicular Technology Conference (VTC Spring)*, IEEE, Yokohama, Japan, IEEE, May 6-9, 2012. ACO-OFDM is described by J. Armstrong et. al. in "Power efficient Optical OFDM", *Electronics Letters*, vol. 42, no. 6, pp. 370-372, 16 Mar. 2006. PAM-DMT is described by S. C. J. Lee et. al. in "PAM-DMT for Intensity Modulated and Direct-Detection Optical Communication Systems", *IEE Photonics Technology Letters*, Vol. 21, no. 23, pp. 1749-1751, December 2009. Flip-OFDM is described by N. Fernando et. al. in "Flip-OFDM for Optical Wireless Communications" in *Information Theory Workshop (ITW)*, IEEE, Paraty, Brazil: IEEE, Oct. 16-20, 2011, pp. 5-9. The contents of all of the above documents are hereby incorporated by reference in their entirety as if set out in full in the present application.

Taking U-OFDM as an example, at the transmitter side, a Hermitian symmetry is applied to a block of symbols from a conventional modulation scheme before applying an inverse fast Fourier transform. This effectively maps the original symbols to different carriers in the frequency domain of the resulting signal. Since the Hermitian symmetry is applied, the inverse fast Fourier transform produces a real, bipolar signal. The time domain signal is then subjected to a transformation in order to make it unipolar. In particular, the transformation into a unipolar signal comprises splitting each bipolar frame into two separate frames, one transmitted after the other. One of the frames (i.e. a positive frame) holds the positive time-domain samples and contains zeros in place of the negative time-domain samples. The other frame (i.e. a negative frame) holds the absolute values of the negative time-domain samples and contains zeros in place of the positive time-domain samples. At the receiver side, each original bipolar frame can be recovered by subtracting the information in the negative frame from the information in the positive frame.

It will be appreciated that the above is only one example of an implementation of the U-OFDM methodology. For example, the frames do not necessarily need to be in order. Furthermore, the positive and negative samples do not necessarily have to be transmitted in two separate frames. The separation in two frames is effectively separation in time. This could be implemented with any type of separation where the positive and the negative samples are conveyed in two separate information streams. Other implementation options would also be apparent to a skilled person.

Although the U-OFDM, ACO-OFDM, PAM-DMT and Flip-OFDM schemes are all capable of much greater power efficiency than the DCO-OFDM scheme, the spectral efficiency of these methods is halved when compared with DCO-OFDM.

As such, it would be beneficial to have a transmission scheme that transmits data in a unipolar signal, such that it is usable with optical wireless communications or other techniques that require or benefit from unipolar signals, but at the same time achieves both a good spectral and power efficiency.

It is at least one object of at least one embodiment of the present invention to provide an alternative or an improvement to the prior art and/or solve at least one problem with the prior art.

BRIEF SUMMARY

According to an aspect of the present invention is a transmission apparatus configured to produce, generate and/ or transmit a signal representative of an original signal comprising one or more data portions, data frames or portions of data frames. Each of the one or more data portions, data frames or portions of data frames of the original signal may be converted into and/or transmitted as a plurality of portions, frames or frame portions of one or more information streams. The transmission apparatus may be configured to concurrently transmit the one or more information streams and at least one other information stream.

One or more of the information streams may be arranged such that the one or more information streams is/are obtainable, recoverable and/or extractable from the plurality of concurrently transmitted information streams.

The transmission apparatus may be configured to transmit at least two, e.g. three or more concurrently transmitted information streams. The transmission apparatus may be configured to transmit seven or five or less concurrently transmitted information streams.

Optionally but not essentially, the transmission apparatus may be or comprise a non-MIMO transmission apparatus, e.g. the transmission apparatus may not or need not be operable or configured or arranged to operate in a MIMO system. The transmission apparatus may comprise or be configured to use only a single transmitter element and/or transmission channel to transmit the information streams, e.g. the transmitter system may not or need not have or use more than one transmitter element and/or transmission channel or link. For example, the transmission apparatus may be configured to transmit the information streams (e.g. the one or more information streams and the at least one other information stream) on each or part of a common and/or individual stream, channel, link or signal, which may optionally be an individual stream, channel, link or signal of a MIMO system.

One or more of the information streams may be arranged such that, the interference due to the at least one other information stream on the at least one information stream does not adversely affect, and/or does not prohibit the reading and/or recovery of, the information carried in the at least one information stream. For example, the symmetry and/or arrangement and/or content of the portions, frames or frame portions of the at least one other information stream may be such that the interference due to the at least one other information stream on the at least one information stream does not adversely affect, and/or does not prohibit the reading and/or recovery of, the information carried in the at least one information stream.

In optional embodiments, the symmetry and/or arrangement and/or content of the portions, frames or frame portions of the at least one other information stream may be such that the interference due to the at least one other information stream is arranged to be orthogonal, or is orthogonal to the at least one information stream and/or is arranged to cancel in subsequent processing. In this way, the interference due to the at least one other information stream on the at least one information stream may not adversely affect the information carried in the at least one information stream.

The plurality of portions, frames or frame portions of the information stream may be processable to obtain the corresponding frame(s) of the original signal. The plurality of information streams may be arranged such that at least part and preferably substantially all of the interference to the portions, frames or frame portions of an information stream caused by at least one other information stream is cancelled or removed or removable by the processing operation used to obtain the corresponding frames of the original signal from the plurality of frames of the information stream.

The frames, frame portions or portions of the at least one other information stream that are transmitted during transmission of one or more portions, frames or frame portions of the at least one information stream corresponding to a given frame of the original signal may be the same as, inverse to, symmetrical to, evenly symmetrical to, symmetrical-in-time to, anti-symmetrical to, oddly-symmetrical to, or anti-symmetrical-in-time to the frames, frame portions or portions of the at least one other information stream transmitted during the transmission of each of the other portions, frames or frame portions of the information stream(s) that correspond to that given frame of the original signal.

In other words, the transmitter may be configured such that a frame of an original signal may be represented by a plurality of signal portions and may be configured to arrange the information streams such that the interference due to other information streams that falls on those signal portions that represent the frame of the original signal has a certain property (which may be dependent on the modulation scheme used) such that the interference cancels during subsequent processing, or stays orthogonal to or does not adversely affect the useful or encoded information. For example, the certain property may comprise the interference due to the other information stream(s) falling on one or more of the signal portions being the same as, inverse to, symmetrical to, evenly symmetrical to, symmetrical-in-time to, anti-symmetrical to, oddly-symmetrical to, or anti-symmetrical-in-time to the interference due to the other information stream(s) falling on at least another of the signal portions.

The transmission apparatus may be configured to encode one or more frames of the original signal using the other information stream(s). The one or more frames of the original signal may be respectively encoded in a plurality of portions, frames or frame portions of the other information stream(s), e.g. a given frame of the original signal may be encoded using two or more portions, frames or frame portions of the other information stream(s). The transmission apparatus may comprise a splitter for splitting the original signal into a plurality of signal portions, wherein different signal portions are transmitted using different information streams.

The number of portions, frames or frame portions of an information stream used to encode a frame of the original signal may be greater than the number of portions, frames or frame portions of at least one other information stream used to encode a frame of the original signal. The number of portions, frames or frame portions of one or more information streams (e.g. higher depth information streams) used to encode a frame of the original signal may be greater than the number of portions, frames or frame portions of one or more other (e.g. lower depth) information streams used to encode a frame of the original signal.

For example, a frame of the original signal may be encoded in two portions, frames or frame portions of a first information stream. A second information stream may encode a frame of the original signal using four portions, frames or frame portions of the second information stream. A third information stream may encode a frame of the original signal using eight portions, frames or frame portions of the third information stream. Each additional information stream may encode a frame of the original signal in a factor of two more portions, frames or frame portions than the highest number of portions, frames or frame portions used by the other information streams used to encode a frame of the original signal.

The original signal may be or comprise a bipolar signal, which may comprise a plurality of bipolar frames. The plurality of information streams may be or comprise unipolar information streams, which may comprise a plurality of unipolar portions, frames or frame portions.

The frames of the original signal may be encoded using a U-OFDM method to produce one or more of the information streams. The frames of the original signal may comprise symbols encoded using an M-QAM modulation scheme for subcarrier modulation in the frequency domain, although it will be appreciated that other suitable modulation schemes may be optionally used. The symbols may be encoded using 4-QAM or higher modulation (e.g. 8-QAM, 16-QAM and upwards).

In embodiments, one or more frames of the original signal may be respectively split into one or more first frames and one or more second frames of the information stream(s), wherein either the first or second frames comprise a positive frame in which the positive time domain samples of the respective frame from the original signal are held or maintained and the negative time domain samples are clipped and the other of the first or second frames comprise a negative frame in which the absolute values of the negative time domain samples of the respective frame from the original signal are held or maintained and the positive time domain samples are clipped.

The clipping of the positive or negative samples may comprise providing zeros or no signal or a signal less than a threshold in place of the positive or negative samples. In particular, it will be appreciated that although zeros are preferable for processing efficiency, other distinguishable values could be used instead of zeros, e.g. preset or calculated values that are distinguishable from the time domain samples.

The one or more second frames may be transmitted after the one or more first frames. The one or more second frames (and/or a cyclic prefix associated with the one or more second frames) may be transmitted immediately after the one or more first frames.

The original frame may be recoverable by subtraction or addition of one of the first or second frames of the information stream from/to the other of the first or second frames.

The other information stream(s) may comprise one or more duplicates of at least one and preferably each portion, frame or frame portion of the other information stream. The number of duplicates of each portion, frame or frame portion may vary between information streams. For example, each positive and negative frame may be duplicated once in the second information stream (i.e. so that there are two copies of each frame), duplicated three times in the third information stream (i.e. so that there are four copies of each frame), duplicated seven times for the fourth information stream (i.e. so that there are eight copies of each frame) and so on for higher depth information streams, e.g. such that the number of copies of each frame increases by a factor of two each time.

The transmitter may be configured to convert the original signal into the one of more information streams. The plurality of frames of the one or more information streams that are associated with each frame of the original signal may be processable to determine the associated frame of the original signal from which they were derived.

The frames of the original signal may be encoded using at least one of a U-OFDM or an ACO-OFDM or PAM-DMT or Flip-OFDM method to produce the information streams.

The first and second portions, frames or frame portions may be provided alternately, in other words, for each information stream, a second portion, frame or frame portion (and/or a cyclic prefix associated with the second portion, frame or frame portion) may follow a first portion, frame or frame portion and/or a first portion, frame or frame portion (and/or a cyclic prefix associated with the first portion, frame or frame portion) may follow a second portion, frame or frame portion.

The transmitter may be configured to transmit one or more frame pairs of the at least one other information stream. Each frame pair may comprise a first and a second portion, frame or frame portion of the at least one other information stream.

At least one frame pair of at least one other information stream that is transmitted during transmission of at least a first portion, frame or frame portion of the at least one information stream that corresponds to a given frame of the original signal may be the same as, inverse to, symmetrical to, evenly symmetrical to, symmetrical-in-time to, anti-symmetrical to, oddly-symmetrical to, or anti-symmetrical-in-time to at least one frame pair of the at least one other information stream that is transmitted during transmission of at least one and preferably each other portion, frame or frame portion of the at least one information stream that corresponds to that given frame of the original signal.

The transmission apparatus may be or comprise optical wireless transmission apparatus.

The transmission apparatus may comprise a signal processor. The transmission apparatus may comprise at least one transmitter element for transmitting a processed signal received from the signal processor. The signal processor may be configured to convert a signal from a bipolar signal into a unipolar signal.

The signal processor may comprise at least one signal input for receiving an input signal and/or at least one modulator for modulating the signal and/or a pulse shaper for shaping the signal and/or a clipper for clipping the negative values of the pulse shaped bipolar signal. For example, the signal processor may be configured to apply a pulse shaping filter to the bipolar signal to produce a pulse shaped bipolar signal. The signal processor may be configured to convert one or more portions of the bipolar signal into corresponding unipolar signals, for example, for transmission in the plurality of information streams. The bipolar signal may be split into the portions by the splitter. The signal processor may be configured to clip the negative and/or positive values of the pulse shaped bipolar signal to produce the unipolar signal. The signal processor may be configured to convert one or more portions of the bipolar signal into unipolar signals using a U-OFDM, ACO-OFDM, Flip-OFDM or PAM-DMT modulation scheme. The signal processor may be configured to re-order, duplicate, create counterparts that are the same as, inverse to, symmetrical to, evenly symmetrical to, symmetrical-in-time to, anti-symmetrical to, oddly-symmetrical to, or anti-symmetrical-in-time to, or otherwise process, one or more portions, frames or frame portions of one or more of the unipolar signals.

The at least one transmitter element may comprise an intensity modulated transmitter element. The at least one transmitter element may comprise at least one and preferably a plurality of light emitters, such as an array of LEDs or a micro-LED array, an OLED array, a laser diode array or the like.

The input signal may comprise a bit stream. At least one of the one or more modulators may be configured to apply an amplitude modulation scheme, preferably a quadrature amplitude modulation (QAM) scheme such as M-QAM, where M is preferably 4 or higher. At least one of the one or more modulators may be configured to modulate according to an orthogonal and/or non-orthogonal multicarrier technique. For example, at least one of the one or more modulators may comprise an OFDM modulator. The modulator may be configured to output the bipolar signal.

The different information streams may be transmitted simultaneously on the same channel/link. The different information streams may be combinable, combined or otherwise processed or processable to form at least one time domain signal. The one or more information streams and the at least one other information stream and/or one or more portions, frames or frame portions thereof may be transmitted using and/or occupy the same frequency, time slot and/or link and/or may be transmitted using the same transmitter elements or elements.

According to a second aspect of the present invention is a receiver system for receiving a plurality of concurrently transmitted unipolar information streams from transmission apparatus according to the first aspect, the receiving system being configured to convert at least one and preferably each of the unipolar information streams into a bipolar signal.

The receiver system may be configured to recover an original bipolar signal represented by the plurality of unipolar information streams.

The receiver system may comprise a signal processor. The receiver system may comprise one or more receiver elements for receiving the plurality of unipolar information streams. The signal processor may comprise a filter for filtering a signal and/or at least one demodulator for demodulating a signal, and an output for outputting an output signal.

The at least one receiver element may comprise a direct detection receiver element. The at least one receiver element may comprise an optical receiver element, such as a photodiode, phototransistor, CCD or CMOS detector, or any other suitable optical detector. The receiver may be a receiver for an optical communications system.

The at least one of the one or more demodulators may be operable with an amplitude demodulation scheme, preferably a quadrature amplitude demodulation (QAM) scheme such as M-QAM, where M may preferably be 4 or higher. At least one of the one or more demodulators may comprise an OFDM demodulator. At least one of the demodulators may be configured to output a bit stream. The filter may comprise a matched filter. The receiver may comprise a sampler.

The receiving system may be configured to combine two or more portions, frames or frame portions of at least one of the received information streams in order to derive a frame of an original signal. The received information streams may comprise unipolar information streams. The original signal may comprise a bipolar signal. The receiving system may be configured to subtract at least one portion, frame or frame portion of at least one of the received information streams from at least one other portion, frame or frame portion of the at least one received information stream in order to derive a frame of an original signal. At least one and preferably each of the received information streams may comprise data encoded using a U-OFDM, ACO-OFDM, Flip-OFDM or PAM-DMT based method, or any other equivalent method.

The receiver system may be configured to derive a plurality of frames of an original signal, wherein each frame of the original signal is determined by combining two or more portions, frames or frame portions of at least one of the received information streams.

The receiver system may be configured to re-convert one or more portions of the original signal back into at least one unipolar information stream. The receiver system may be configured to subtract one or more of the recovered unipolar information streams from the received signal that comprises a plurality of information streams. The receiver system may be configured to iteratively and/or sequentially, for at least a plurality of information streams and optionally each information stream, combine frames of respective information streams from the received signals in order to determine the portion of the original signal encoded in that information stream. The receiver system may be configured to reconstruct the information stream from the determined portion of the original signal. The receiver system may be configured to subtract the reconstructed information stream from the received information stream.

According to a third aspect of the present invention is a communications system comprising a transmission apparatus according to the first aspect and a receiving system according to the second aspect.

According to a fourth aspect of the present invention is a transmission method. The transmission method may comprise producing, generating and/or transmitting a signal representative of an original signal comprising one or more data frames. Each of the one or more frames of the original signal may be converted into and/or transmitted as a plurality of frames or frame portions of one or more information streams. The method may comprise concurrently transmitting the one or more information streams and at least one other information stream.

The method may be or comprise a non-MIMO transmission method. The method may be carried out using only a single transmitter element and/or transmission channel or link for transmitting a processed signal. For example, the method may comprise transmitting the information streams (e.g. the one or more information streams and the at least one other information stream) on each or part of an individual stream, channel, link or signal, which may optionally be an individual stream, channel, link or signal of a MIMO system.

The different information streams may be transmitted simultaneously on the same channel/link. The different information streams may be combinable, combined or otherwise processed or processable to form at least one time domain signal. The one or more information streams and the at least one other information stream and/or one or more portions, frames or frame portions thereof may be transmitted using and/or occupy the same frequency, time slot and/or link and/or may be transmitted using the same transmitter element or elements.

One or more of the other information streams may be arranged such that the interference on the at least one information stream due to the at least one other information stream is orthogonal to the information carried in the at least one information stream. For example, the symmetry and/or arrangement and/or content of frames or frame portions in the at least one other information stream may be such that the interference due to the at least one other information stream on the at least one information stream is orthogonal to the information carried in the at least one information stream.

The transmission method may comprise use of the transmission apparatus of the first aspect and/or may comprise at least one feature described in relation to the first aspect.

According to a fifth aspect of the present invention is a method for receiving and/or decoding and/or recovering a signal from a plurality of unipolar information streams. The unipolar information streams may comprise concurrently transmitted information streams.

The information streams may be information streams transmitted by the transmission apparatus of the first aspect and/or using the method of the third aspect. The method may comprise using a receiver according to the second aspect.

The method may comprise combining two or more portions, frames or frame portions of at least one of the received information streams in order to derive a frame of an original signal. The received information streams may comprise unipolar information streams. The original signal may comprise a bipolar signal. The method may comprise subtracting at least one portion, frame or frame portion of at least one of the received information streams from at least one other portion, frame or frame portion of the at least one received information stream in order to derive a frame of an original signal. At least one and preferably each of the received information streams may comprise data encoded using a U-OFDM, ACO-OFDM or PAM-DMT based method, or any other equivalent suitable modulation technique.

The method may comprise recovering a plurality of frames of an original signal, wherein each frame of the original signal is determined by combining two or more portions, frames or frame portions of at least one of the received information streams.

The method may comprise re-converting at least one or more portions of the original signal back into at least one unipolar information stream. The method may comprise subtracting one or more of the recovered unipolar information streams from the received signal that comprises a plurality of information streams.

The method may comprise iteratively, for at least a plurality of information streams and optionally each information stream, combining frames of respective information streams from the received signals in order to determine the portion of the original signal encoded in that information stream. The method may comprise reconstructing the information stream from the determined portion of the original signal. The method may comprise subtracting the reconstructed information stream from the received information stream.

According to a sixth aspect of the present invention is a device comprising a communications system, wherein the communications system comprises transmission apparatus according to the first aspect and/or a receiver system according to the second aspect.

The device may comprise a fixed transmitter and/or receiver unit or system. The device may be or comprise a mobile communications device, such as a tablet computer, mobile phone, smart watch, a sensor, and/or the like. The communications system may comprise an optical wireless communications system. The communications system may comprise a two-way communications system. The communications system may comprise a one way communications system.

According to a seventh aspect of the present invention is a computer program product configured to implement the apparatus of the first, second, third or sixth aspects or the method of the fourth or fifth aspects.

According to an eighth aspect of the present invention is a carrier medium comprising or carrying the computer program product of the seventh aspect.

According to a ninth aspect of the present invention is a processing or computational apparatus when loaded with the computer program product of the seventh aspect.

Features described in relation to any of the above aspects may also be applicable to any of the other above aspects. Features described in combination in relation to any of the above aspects may be jointly or individually and separably applicable to any other of the above aspects. Apparatus features configured to implement the features described above in relation to a method and also method features corresponding to the use and fabrication of any apparatus features described above are also intended as falling within the scope of the present invention.

BRIEF DESCRIPTION OF THE FIGURES

These and other aspects of the present invention will now be described, by way of example only, with reference to the accompanying drawings, in which:

FIG. 2 is a representation of information streams for transmission according to an embodiment of the present invention;

FIG. 8 is a representation of information streams for transmission according to another embodiment of the present invention;

FIG. 9 is a representation of information streams for transmission according to a further embodiment of the present invention;

DETAILED DESCRIPTION OF VARIOUS EMBODIMENTS

As detailed above, traditional OFDM generally produces complex valued time domain samples, whereas the intensity modulation/direct detection techniques commonly used in optical wireless communications require real unipolar signals. The DCO-OFDM technique can be used to produce a non-negative, unipolar signal but this technique significantly increases the power dissipation of the signal. U-OFDM, ACO-OFDM, PAM-DMT and Flip-OFDM methods can also be used to provide unipolar signals and are capable of much greater power efficiency than the DCO-OFDM scheme. However, the spectral efficiency of these methods is halved when compared with DCO-OFDM.

At least some embodiments of the present invention seek to provide a technique for providing unipolar signals for transmission in a manner that is both power and spectrally efficient.

At least some embodiments of the present invention provide concurrent or simultaneous transmission of a plurality of data streams in order to increase the spectral efficiency. These information streams use the same communication resources, e.g. they could occupy the same time slot, frequency, link, etc. Advantageously, the individual information streams may be encoded using methods based on techniques such as U-OFDM, ACO-OFDM, PAM-DMT and Flip-OFDM, as examples, that are more power efficient than DCO-OFDM.

In this case, the information from one information stream can act as noise towards the information on the other information streams. As such, when the information from the first stream is decoded, the information from all subsequent streams can act as a strong noise component, which could inhibit or prevent recovery of the first information stream.

At least some embodiments of the present invention address this by arranging the concurrent information streams such that there is symmetry between the information streams that allows this interference to be cancelled out (e.g. in the case for U-OFDM) or to be orthogonal to the information (e.g. in the case for ACO-OFDM and PAM-DMT). When the interference is orthogonal to the information, the interference does not reflect on the information and so does not corrupt the information symbols, i.e. mathematically, it falls in orthogonal space.

Known methods such as superposition modulation involve the transmission of multiple information streams. However, such techniques have not been considered or contemplated for use in the conversion of bipolar to unipolar signals or in the transmission of purely unipolar signals. Nor would a skilled person consider the straightforward application of techniques such as superposition modulation to this problem, as there would be issues with interference due to the presence of the multiple information streams and the overlapping of symbols, with no guidance of how to solve this issue. As such, more is required than just a simple application or combination of existing techniques and a totally novel approach is required.

Figure 1:
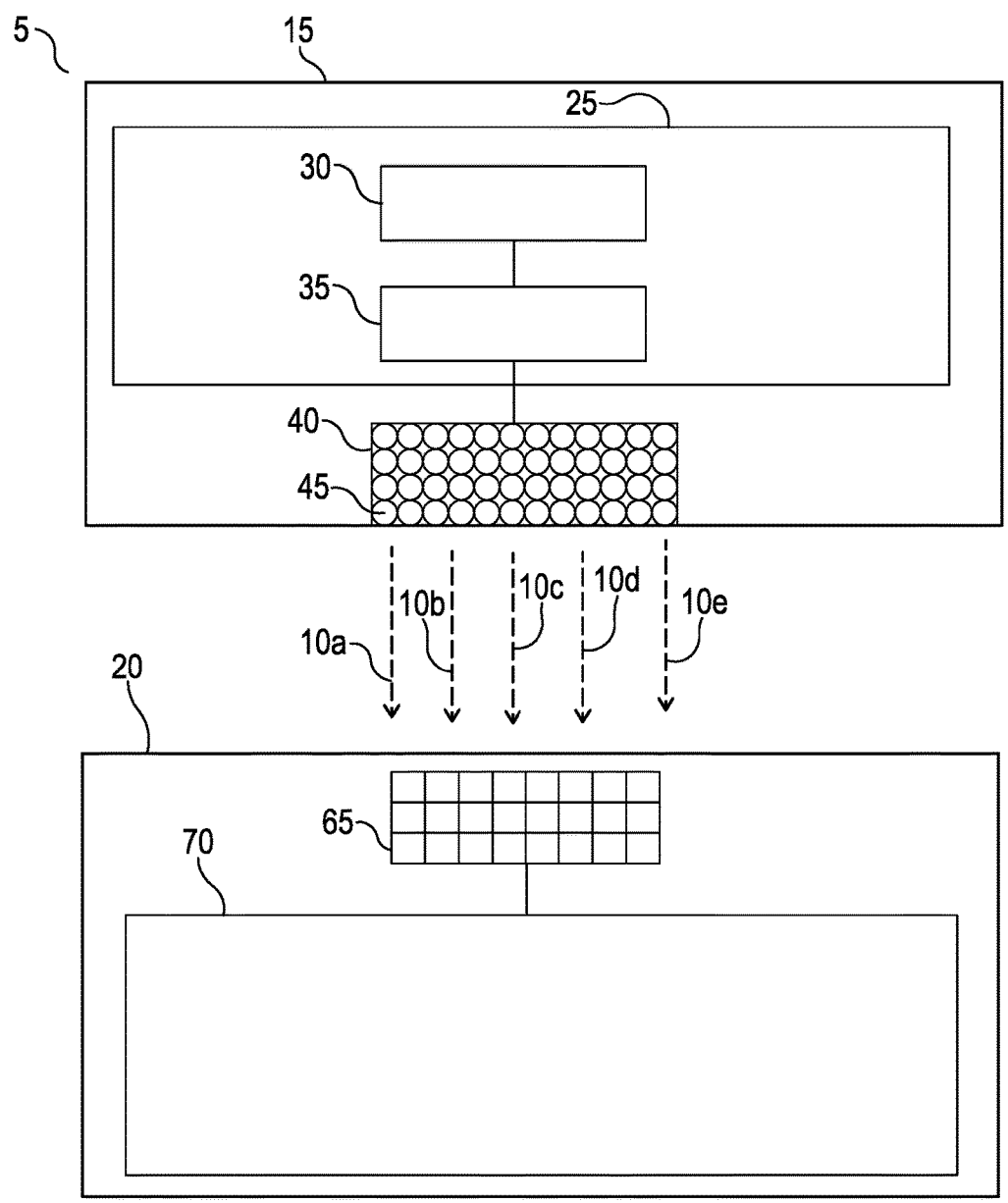
FIG. 1 is a schematic of a communications system for implementing the present invention.

FIG. 1 shows a communications system 5 configured to implement various embodiments of the present invention. The communications system 5 is configured to convert a bipolar signal into a plurality of unipolar information streams 10 for concurrent transmission from a transmission side, and to reconstruct the bipolar signal from the received unipolar information streams 10 at a receiver side. The present invention is particular suitable for optical wireless communications systems and is described herein in relation to this application. However, it will be appreciated that the present invention may also be applicable to other communications systems such as those using microwave or radio frequency radiation, or other regions or the electromagnetic spectrum or sonic communications methods, or the like.

Furthermore, the plurality of information streams 10 will be described in terms of depth of the information stream 10, wherein the depth is inversely proportional to the capacity of the information stream 10. In other words, the highest capacity information stream 10a is referred to as the stream having depth 1 and each further information stream 10b, 10c, 10d, 10e having successively lower capacity is referred to as streams of depth 2, 3, 4, 5, and so on.

The communications system 5 comprises one or more transmitters 15 for converting the bipolar signal into the plurality of unipolar information streams 10 and for transmitting the plurality of unipolar information streams 10 concurrently to one or more receivers 20 for receiving the unipolar information streams 10 and reconstructing the bipolar signal from the received unipolar information streams 10.

The transmitter 15 is provided with a signal processor 25 configured to implement a splitter 30 for splitting the bipolar signal to be transmitted into a plurality of sections and a converter module 35 for converting the sections of the bipolar signal into the unipolar information streams 10. The transmitter 15 further comprises a transmission apparatus 40 for concurrently or simultaneously transmitting the information streams 10, e.g. the plurality of information streams 10 are transmitted in parallel. It will be appreciated that the different information streams 10 can be transmitted simultaneously on the same channel/link and added to form one time domain signal.

The splitter 30 is configured to split the bipolar signal into appropriately sized sections for transmission in the plurality of information streams 10. As will be apparent from the following, each information stream 10 is capable of different transmission rates and/or capacities. As such, the bipolar signal is not split equally, and more of the data is assigned to higher capacity information streams 10 than to lower capacity information streams 10. The relative transmission capacities of each information stream 10 are straightforwardly determinable, as will be evident from the description below.

The transmission apparatus 40 comprises an array of transmitter elements 45, such as LEDs, OLEDs, laser diodes or the like. In an optional embodiment, the transmission apparatus comprises a micro LED or OLED array.

The converter module 35 is configured to convert each section of the bipolar signal into a unipolar signal for transmission in the associated information stream 10. The bipolar signal is an OFDM signal realised by taking the inverse fast Fourier transform of data encoded by symbols from a conventional modulation scheme known in the art, such as quadrature amplitude modulation (M-QAM). In this particular embodiment, the converter module 35 is configured to convert the signal based on a modified U-OFDM method. However, it will be appreciated that the principles set out herewith could also be applicable with other methods such as ACO-OFDM, Flip-OFDM and PAM DMT, as will be described later.

In the present embodiment, the converter module 35 is arranged to convert each frame of the bipolar signal into $2^n$ frames 50 for transmission in the information streams 10, wherein n is the depth of the information stream 10 in which the frames 50 are to be transmitted. For example, for the depth 1 information stream 10a, a given frame of the bipolar signal is represented by two frames 50a, 50b of the depth 1 information stream 10a, along with accompanying cyclic prefixes CP. For the depth 2 information stream 10b, a given frame of the bipolar signal is represented in four frames 50a', 50a', 50b', 50b' of the depth 2 information stream 10b and the accompanying cyclic prefixes CP, and so on for each further information stream 10c-10e.

Figure 3A:
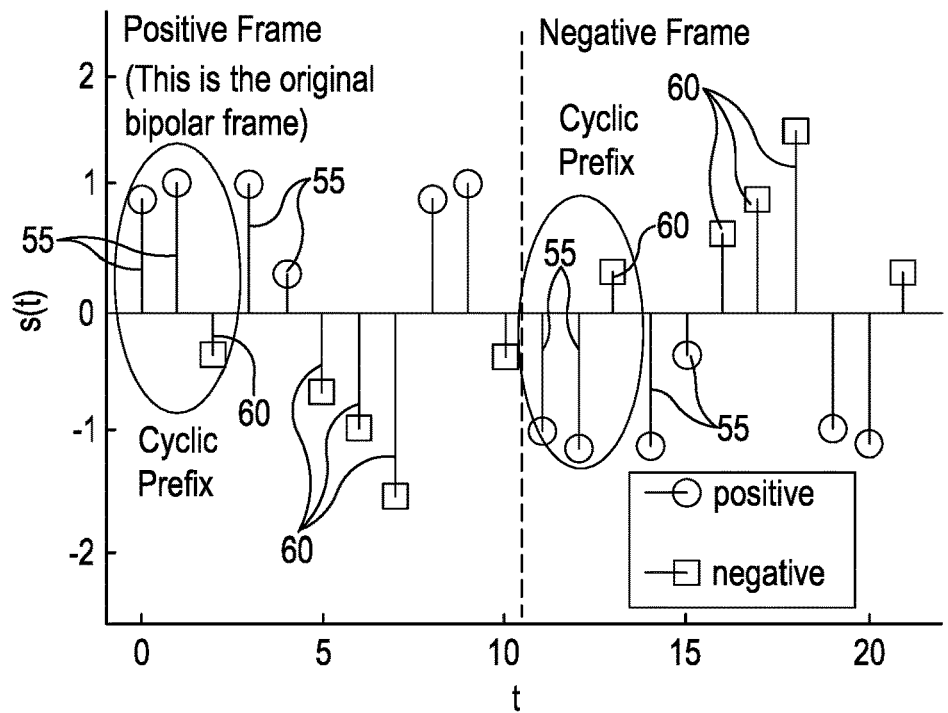
FIG. 3a is a representation of the signs and magnitude of the time domain samples in a bipolar signal.

The bipolar signal comprises both positive 55 and negative 60 time domain samples, an example of which is illustrated by FIG. 3a.

Figure 3B:
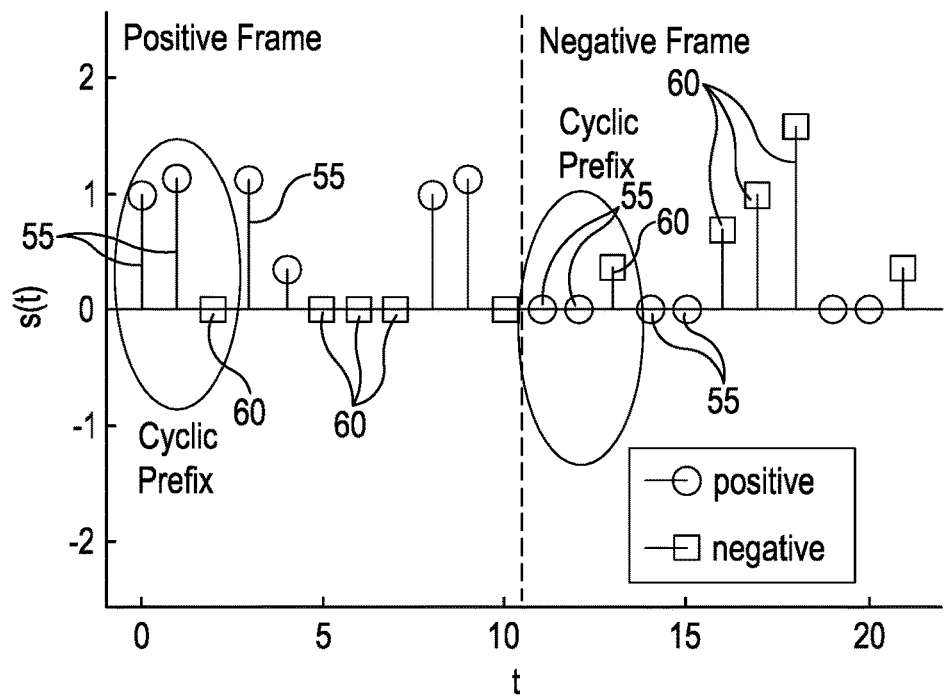
FIG. 3b is a representation of the signs and magnitude of the time domain samples in a unipolar information stream as illustrated by FIG. 2.

For the depth 1 information stream 10a, each bipolar frame of the respective section of the bipolar signal is split into two frames 50a, 50b and the associated cyclic prefixes CP transmitted one after the other, wherein the first (positive) frame 50a contains the positive time domain samples 55 from the bipolar frame and the negative time domain samples 60 of the bipolar frame being clipped, e.g. so as to be zero, and the second (negative) frame 50b comprises the absolute values of the negative time-domain samples 60 of the bipolar frame and the positive time domain samples 55 of the bipolar frame being clipped, e.g. so as to be zero. This results in a unipolar information stream, an example of which is illustrated by FIG. 3b. In this regard, the depth 1 information stream 10 is similar to that found in a conventional U-OFDM system.

A modification of the conventional U-OFDM process is used in relation to the information streams 10b-10e of depth 2 and above in order to ensure that any interference caused by the information streams 10b-10e of depth 2 and above is such that the interference to each frame of a lower depth information stream 10 associated with a given frame of the bipolar signal does not adversely affect information being carried by the lower depth information stream 10. As a result, the interference to each frame 50a, 50b of the lower depth information stream 10 caused by the information streams 10b-10e of depth 2 and above is cancelled out during the process of recovering the bipolar signal.

Each bipolar frame of the respective section of the bipolar signal is represented using four frames of the information stream 10b at depth 2. In particular, each frame of the bipolar signal is encoded by a first (positive) frame 50a' comprising the positive time domain samples 55 from the bipolar frame and with negative time domain samples 60 of the bipolar frame clipped, e.g. so as to be zero, and a second (negative) frame 50b' containing the absolute values of the negative time-domain samples 60 of the bipolar frame and the positive time domain samples 55 of the bipolar frame being clipped, e.g. so as to be zero. However, instead of sequentially providing the first (positive) frame 50a' followed by the second (negative) frame 50b', as in the depth 1 information stream 10a, each of the first (positive) and second (negative) frames 50a', 50b' of the depth 2 information stream 10b are duplicated so that the first (positive) frame 50a' (and the associated cyclic prefix CP) is provided twice before the second (negative) frame 50b' (and the associated cyclic prefix CP) is also provided twice. In other words, in the present embodiment, $2^{(n-1)}$ instances of each frame 50a', 50b' of each information stream 10 is provided, where n is the depth of the information stream 10. The frame duration of the first and second information streams 10a, 10b is the same, such that the first (positive) frame 50a' of the depth 2 information stream 10b is transmitted whilst the first (positive) frame 50a of the depth 1 information stream 10a is transmitted and the same first (positive) frame 50a' of the depth 2 information stream 10b is transmitted again whilst the second (negative) frame 50b of the depth 1 information stream 10a is transmitted. In this way, since the same content is being transmitted in the depth 2 information stream 10b during transmission of the first (positive) and second (negative) frames 50a, 50b of the depth 1 information stream 10a, the same interference from the depth 2 information stream 10b is experienced by both the first (positive) and second (negative) frames 50a, 50b of the depth 1 information stream 10a associated with any given frame of the original bipolar signal. As such, when a second (negative) frame 50b of the depth 1 information stream 10a is subtracted from the first (positive) frame 50a of the depth 1 information stream 10a, the components of each of those frames arising from interference from the depth 2 information stream 10b cancel out.

Similarly, for the information stream 10c at depth 3, each of the first (positive) and second (negative) frames 50a'', 50b'' of the depth 3 information stream 10c are replicated a further three times, so that the first (positive) frame 50a'' (and the associated cyclic prefix) is provided four times before the second (negative) frame 50b'' is also provided four times. The frame duration in each of the information streams 10a-10e is the same, such that the first (positive) frame 50a'' of the depth 3 information stream 10c is transmitted whilst the first (positive) frames 50a, 50a' of the depth 1 and depth 2 information streams 10a, 10b are transmitted and the same first (positive) frame 50a'' of the depth 3 information stream is re-transmitted whilst the second (negative) frame 50b of the depth 1 information stream 10a and the duplicate of the first (positive) frame 50a'' of the second information stream 10b is transmitted. The first (positive) frame 50a'' of the depth 3 information stream 10c is re-transmitted again during transmission of the second (negative) frame 50b' and the duplicate of the second (negative) frame 50b' of the depth 2 information stream 10b. In this way, since the same content is being transmitted in the depth 3 information stream 10c during transmission of each of the frames 50a, 50b, 50a', 50b' of the depth 1 and depth 2 information streams 10a, 10b that are associated with a given frame of the original bipolar signal, any interference due to the depth 3 information stream 10c on the depth 2 and depth 1 information streams 10a, 10b cancels out when the respective frame subtractions are made in order to recover the frames of the respective sections of the original bipolar signal from the depth 1 and depth 2 information streams 10a, 10b.

It will be appreciated that the above principles could be scaled to depth 4, 5 and above information streams 10d, 10e, if required.

Since each frame 50a', 50b', 50a'', 50b'' in the information streams 10b-10e of depth 2 and greater is transmitted a plurality of times, the power of each frame 50a', 50b', 50a'', 50b'' is scaled by a factor of $$\frac{1}{2^{(n-1)}},$$

where n is the depth of the information stream 10b-10e and the amplitude of each frame 50a', 50b', 50a", 50b" is scaled by a factor of $$\frac{1}{\sqrt{2^{(n-1)}}}.$$

The receiver 20 (see FIG. 1) comprises one or more receiver elements 65, such as a single photodiode, or an array of photodiodes, CCD or CMOS receiver elements, for receiving the plurality of unipolar information streams 10a-10e. The receiver 20 further comprises a signal processor 70 for processing the plurality of unipolar information streams 10a-10e in order to recover the original bipolar signal.

In order to recover the bipolar signal at the receiver 20, the information stream 10a at depth 1 can be recovered in the conventional manner for OFDM streams. In other words, each second (negative) frame 50b is subtracted from each first (positive) frame 50a, followed by conventional OFDM demodulation of the resulting bipolar frames, as described in GB2496379 and WO/2013/064835 and in "Novel Unipolar Orthogonal Frequency Division Multiplexing" by D. Tsonev, S. Sinanović and H. Haas, *Proc. Of the Vehicular Technology Conference (VTC Spring)*, IEEE, Yokohama, Japan, IEEE, May 6-9, 2012, each of which is incorporated by reference in their entirety.

For the example shown in FIG. 2, the first bipolar frame is obtained from the operation P11–N11, the second is obtained from the operation P12–N12 and so on, where P represents positive frames 50a, 50a', 50a", N represents negative frames 50a, 50a', 50a", the first number represents the depth of the information stream 10a-10e and the second number represents the number of the frame of the section of the original bipolar signal. It should be noted that the additional information streams 10b-10e do not interfere with the successful demodulation because the interference caused by P21+P31 that falls on P11 is the same as the interference on N11. Hence, the subtraction operation causes both interference terms to be cancelled out. The same happens with the interference terms on all subsequent frames. Hence, the information from the depth 1 information stream 10a can be successfully recovered with a conventional U-OFDM demodulator.

Once this has been recovered, the demodulated bits from the depth 1 information stream 10a can be remodulated again in order to recover the original depth 1 information stream 10a. This recovered depth 1 stream 10a can then be subtracted from the received signal such that the result only contains the information streams 10b-10e from depth 2 and above. The information transmitted by the depth 2 information stream 10b can then be recovered. The process for this comprises summing every two consecutive pairs of frames 50a", 50b" where the information is the same. For example, the first (positive) frame 50a' and the duplicate of the first (positive) frame 50a' of the depth 2 information stream 10a are summed to form a combined first (positive) frame, the second (negative) frame 50b' and the duplicate of the second (negative) frame 50b' are summed to form a combined second (negative) frame, etc. Then, the demodulation process continues with a conventional U-OFDM demodulation process by subtracting the combined negative frames from the combined positive frames, in a similar manner to that described in relation to the depth 1 information stream 10a. Again, the higher depth information streams 10c-10e do not interfere due to their structure and the subtraction operation. After the bits are recovered, they are remodulated and the resulting remodulated depth 2 information stream 10b is subtracted from the overall signal to leave only the information streams 10c-10e of depth 3 and higher. This process continues until the information streams 10a-10e at all depths are recovered.

It will be appreciated that the spectral efficiency of the above process is the sum of the spectral efficiencies of the information streams 10a-10e at all depths. As the maximum modulation depth increases, the spectral efficiency of the above process converges to the spectral efficiency of DCO-OFDM. For a maximum modulation depth of five, the spectral efficiency is already 96.8% of that of the DCO-OFDM method, which means the difference is effectively negligible.

Figure 4:
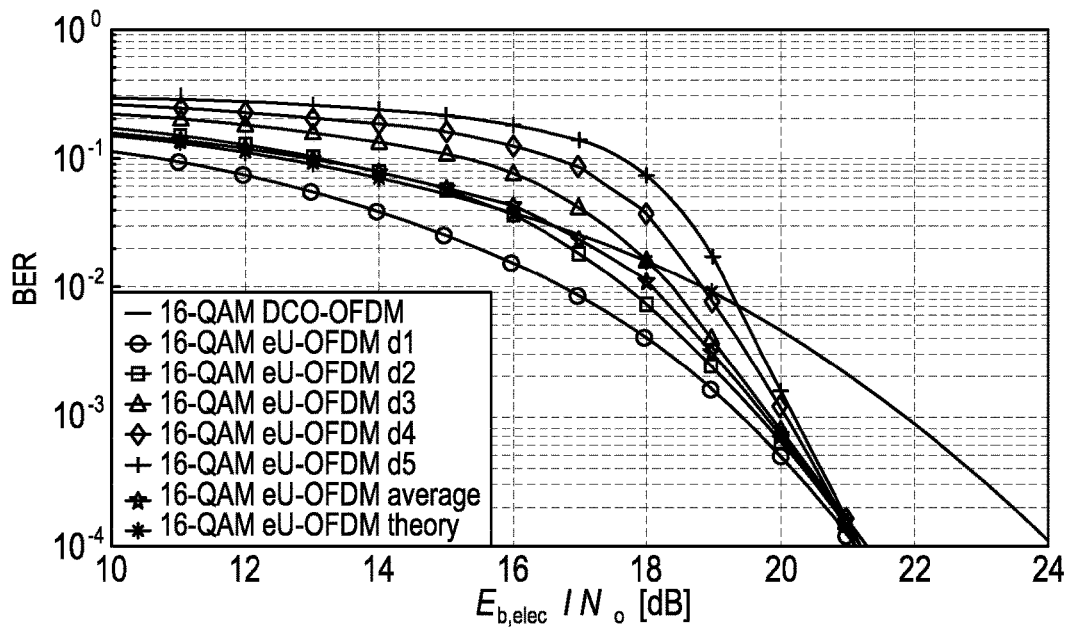
FIG. 4 is an illustration of the comparative BER performance in terms of electrical signal to noise ratio of the method illustrated with respect to FIG. 2 against DCO-OFDM for various modulation depths.
Figure 5:
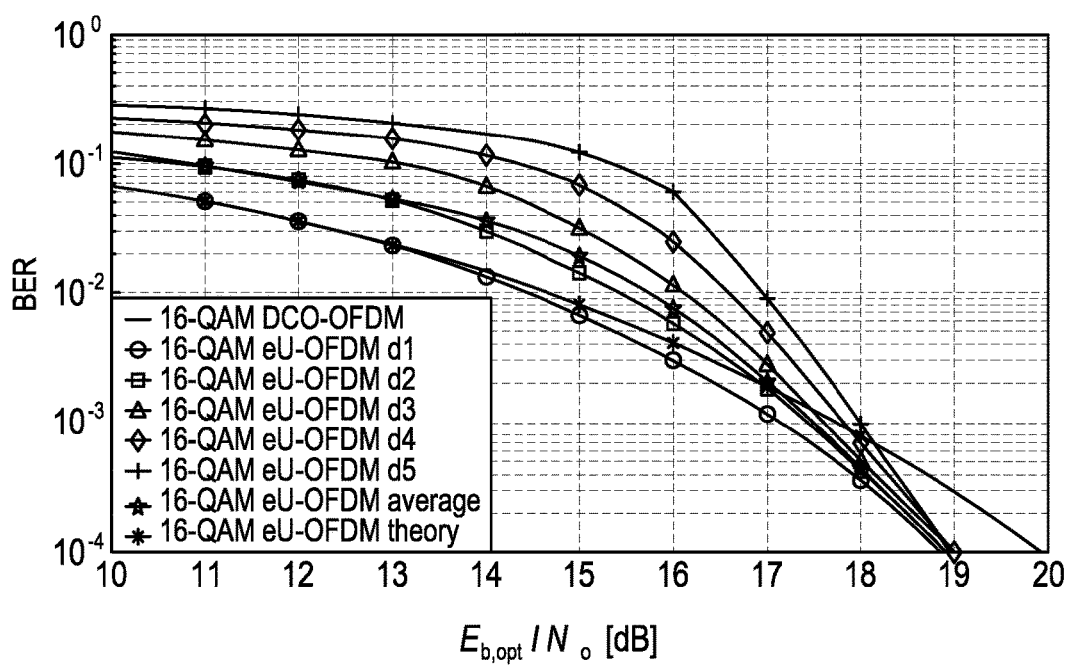
FIG. 5 is an illustration of the comparative BER performance in terms of optical signal to noise ratio of the method illustrated with respect to FIG. 2 against DCO-OFDM for various modulation depths.

The performance of the information streams at different depths is illustrated in FIG. 4. As expected, the information stream 10a at depth 1 performs best. All subsequent information streams 10b-10e converge to the performance of the first information stream 10a as the SNR increases. The same behaviour is observed in FIG. 5 where the performance is illustrated as a function of the optical SNR.

Figure 6:
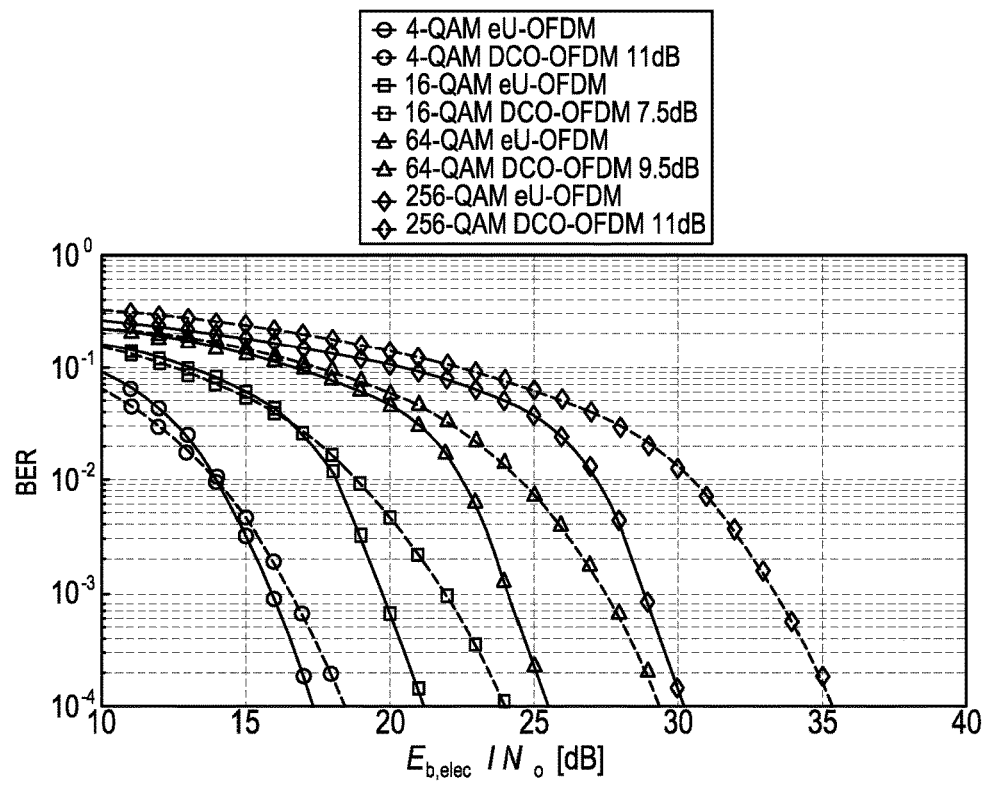
FIG. 6 is an illustration of the comparative BER performance in terms of electrical signal to noise ratio of the method illustrated with respect to FIG. 2 against DCO-OFDM for various M-QAM constellation sizes.
Figure 7:
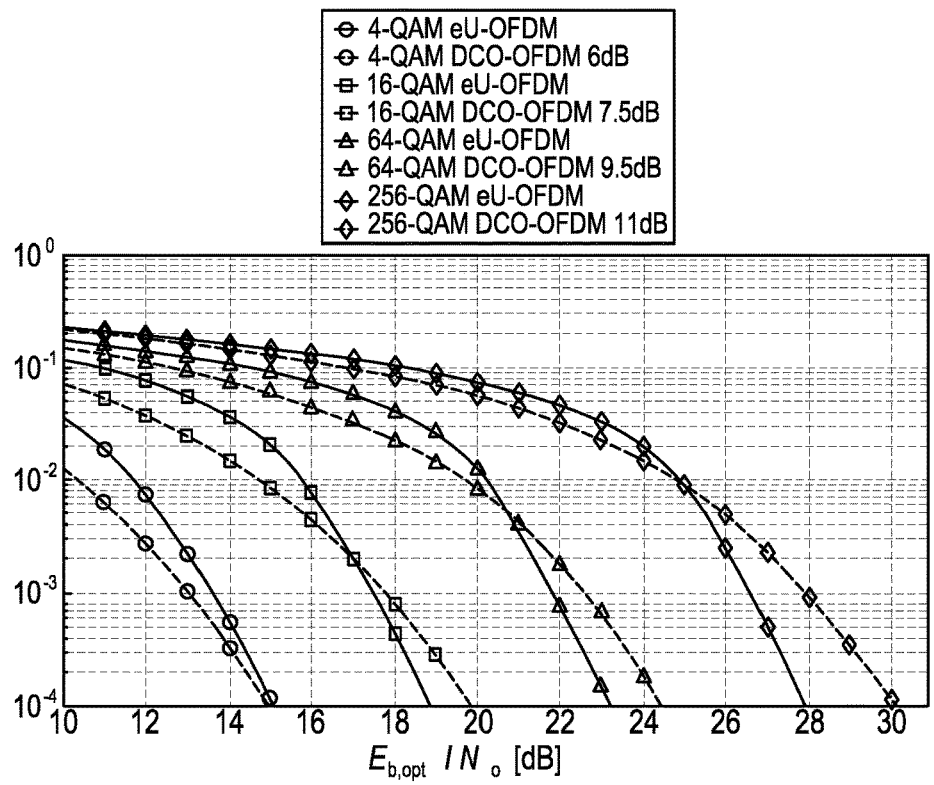
FIG. 7 is an illustration of the comparative BER performance in terms of optical signal to noise ratio of the method illustrated with respect to FIG. 2 against DCO-OFDM for various M-QAM constellation sizes.

The average BER for the information in all depths is compared against the BER of DCO-OFDM for different sizes of the M-QAM constellation in FIGS. 6 and 7.

FIG. 6 presents the results as a function of the electrical SNR. The performance improvement of the present system over DCO-OFDM starts at 1 dB for M=4 at a bit error rate (BER) of $10^{-4}$ and increases to about 5 dB for M=256.

FIG. 7 illustrates the performance difference between the present system and DCO-OFDM for different constellation sizes in terms of BER as a function of the optical SNR. For M=4, the two schemes seem to perform equivalently at BER=$10^{-4}$. As the constellation size increases, the increasing biasing requirement of DCO-OFDM causes the present system to become more efficient. The savings in terms of optical power reach about 2 dB for 256-QAM.

Although the above example describes a system based on use of unipolar OFDM (U-OFDM), the principle for enhanced spectral efficiency described above can be applied to other unipolar OFDM-based modulation schemes, such as but not necessarily limited to asymmetrically clipped optical OFDM (ACO-OFDM), pulse-amplitude-modulated discrete multitone modulation (PAM-DMT) and Flip-OFDM.

FIG. 8 illustrates an embodiment of the present invention that is based on the ACO-OFDM modulation scheme described by J. Armstrong et. al. in "Power efficient Optical OFDM", *Electronics Letters*, vol. 42, no. 6, pp. 370-372, 16 Mar. 2006, the teaching of which is incorporated by reference. In this case, the frame of the ACO-OFDM signal in the time domain can be divided into two portions, wherein the first portion ranges from the first sample of the frame (at position 0) until sample Nfft/2−1 where Nfft is the inverse fast Fourier transform (IFFT) size. The second portion of the frame ranges from sample Nfft/2 until sample Nfft−1 which is the last sample of the frame because the first sample is marked at position 0. The cyclic prefix size is not counted in this calculation. In FIG. 8, the two portions of each frame are denoted with the letters A and B.

In ACO-OFDM, only the oddly-indexed subcarriers are modulated with information in the frequency domain. The evenly-indexed subcarriers are set to zero. This creates a type of anti-symmetry in the time-domain bipolar (before clipping) ACO-OFDM frame, which is termed anti-symmetry in time. This means that s[n]=−s[n+Nfft/2], where s[n] represents the samples of the time domain signal within one bipolar ACO-OFDM frame and there are Nfft samples with n taking values between 0 and Nfft/2−1. In this case, the first half of the frame is anti-symmetrical in time to the second half. This anti-symmetry in time not only allows the negative samples to be removed without distortion, as in conventional ACO-OFDM, but in embodiments of the present invention also allows additional signal components to be introduced which are symmetrical-in-time and as such do not interfere with the ACO-OFDM information signal. If a signal has a symmetry in time, i.e. s[n]=s[+Nfft/2] for $0<=n<=Nfft/2-1$ then, in the frequency domain, it has non-zero components only on the even-indexed subcarriers. Therefore, any signal that has a symmetry in time for the interval that contains the ACO-OFDM frame, would introduce signal components only on the evenly-indexed subcarriers in the frequency domain and so will not influence the ACO-OFDM information, which is modulated on the oddly-indexed subcarriers. It should be noted that this example is illustrated for a frame whose size is an even number since the most efficient application of the FFT/IFFT algorithms is realised for a number of samples that are a power of two. In case the frame has an odd number of samples, the principle is analogous with a minor correction in the time-domain sample indexing.

In view of the above, due to the nature of the ACO-OFDM modulation scheme, if the interference that falls on the frame portion A is equivalent to the interference that falls on the frame portion B, i.e. the interference is symmetrical-in-time, then, in the frequency domain, this interference will fall on the even subcarriers and hence stay orthogonal to the useful information. The present embodiment exploits this in order to add additional information streams 110b-110c to ACO-OFDM stream 110a. The principle is analogous to the principle applied above in relation to the enhanced unipolar orthogonal frequency division multiplexing method. The embodiment illustrated in FIG. 8 is only one possible example of how to add multiple information streams 110a-110c. It will be appreciated that a person skilled in the art and familiar with the ACO-OFDM could determine alternative stream arrangements in order to satisfy the required symmetry for stream orthogonality based only on the teaching of the present application in conjunction with routine skill in the art. Nevertheless, the essence of the algorithm is in exploiting the ACO-OFDM frame structure by adding symmetric interference, so any alternative frame arrangements would simply be variations inspired by the current principle.

In the example of FIG. 7, the frame portions $A_{2x}$, $B_{2x}$ of the depth 2 information stream 110b have a shorter duration than the frame portions $A_{1x}$, $B_{1x}$ of the depth 1 information stream 110a, such that a first frame portion $A_{2x}$ and a second frame portion $B_{2x}$ and an associated cyclic prefix CP of the depth 2 information stream 110b are provided during transmission of a first frame portion $A_{1x}$ of the depth 1 information stream 110a that corresponds to a given frame of the original bipolar signal. The first and second frame portions $A_2$, $B_{2x}$ and the associated cyclic prefix CP of the depth 2 information stream 110b are duplicated during transmission of the second frame portion $B_{1x}$ of the depth 1 information stream 110a that corresponds to the given frame of the original bipolar signal. In this way, each frame portion $A_{1x}$, $B_{1x}$ of the depth 1 information stream 110a that corresponds to a given frame of the original bipolar signal experiences the same interference due to the depth 2 information stream 110b, i.e. the interference is symmetrical-in-time.

Further information streams 110c can also be provided using the same principle. For example, the frames $A_{3x}$, $B_{3x}$ of the depth 3 information stream 110c have a shorter duration than the frames of the depth 2 information stream 110b, such that a first and second frame portions $A_{3x}$, $B_{3x}$ of the depth 3 information stream 110c, in addition to an associated cyclic prefix CP, are provided during transmission of a first frame portion $A_{2x}$ of the depth 2 information stream 110b that corresponds to a given frame of the original bipolar signal. Duplicates of the first frame portion $A_{3x}$ and second frame portion $B_{3x}$ and the associated cyclic prefix CP of the depth 3 information stream are re-transmitted during transmission of the second frame portion $B_{2x}$, the duplicate of the first frame portion $A_{2x}$ and the duplicate of the second frame portion $B_{2x}$ of the depth 2 information stream 110b that corresponds to the given frame of the original bipolar signal. In this way, each frame portion $A_{1x}$, $B_{1x}$, $A_{2x}$, $B_{2x}$ of the depth 1 and depth 2 information streams 110a, 110b that corresponds to given frames of the original bipolar signal experiences the same interference due to the depth 3 information stream 110c.

It will be appreciated that $2^{n-1}$ instances of each first and second frame portion are provided in each information stream 110a-110c, wherein n is the depth of the stream. Since the same signal portion/frame portion is/are transmitted for the higher depth streams during the transmission of each frame portion of each lower depth information stream that corresponds to a given frame of the original bipolar signal, the interference to the information streams 110a-110c due to the higher depth information remains orthogonal to and does not corrupt the useful information in the lower depth streams 110a-110c when the information streams 110a-110c are processed to recover the frames of the original bipolar signal.

In the above examples described in relation to FIG. 2 and FIG. 8, the operations involved in processing the frames or frame portions of the information streams to recover the modulated data are such that the interference on an information stream caused by the higher depth information streams is cancelled out (e.g. in the example of FIG. 2 based on U-OFDM) or remains orthogonal to and therefore does not affect the useful information in the lower depth streams 110a-110c (e.g. in the example of FIG. 8 based on ACO-OFDM) when symmetrical-in-time interference from the higher depth information streams is experienced by each frame of the information stream that corresponds to a given frame of the original bipolar signal. However, depending on the process that is required to recover the frames of the original bipolar signal, it is not necessarily the case that the interference resulting from higher depth information streams on the frames of an information stream that correspond to a given frame of the original bipolar signal needs to be the same. For example, in some techniques, the process of recovering the frames of the original bipolar signal comprises application of a range of mathematical operators or functions such as symmetry, anti-symmetry or asymmetric operations, applications of matrix operations, interference cancellation, or other mathematical operations, as would be apparent to a skilled person. As such, by providing frames of an appropriate symmetry, asymmetry, arrangement, content, order, and/or degree of duplication in the frames of the information streams having depths greater than 1, it is possible to encode data from the original bipolar signal into frames of the further information streams in such a way that the interference on the frames of a given information stream due to the information streams of higher order (than the given information stream) does not affect the useful information in the given or lower depth stream(s) (e.g. by cancelling or by remaining orthogonal to the useful information in the given or lower depth stream(s)). It will be appreciated that the required symmetry, arrangement, content, order, and/or degree of duplication in the frames of the information streams will vary depending on the modulation scheme used and in particular the operations involved in recovering the information stream for the chosen modulation scheme.

This is illustrated in a further example that is based on the PAM-DMT modulation scheme, for example, as described in S. C. J. Lee et. al. in "PAM-DMT for Intensity Modulated and Direct-Detection Optical Communication Systems", *IEE Photonics Technology Letters*, Vol. 21, no. 23, pp. 1749-1751, December 2009, the teaching of which is incorporated by reference. The example is illustrated with reference to FIG. 9.

The frame in the time domain of a system that uses a PAM-DMT-based method can be divided into two parts A', B'. If Nfft is the PAM-DMT frame size, then the first part A' ranges from the first sample of the frame (at position 0) until sample $$\frac{Nfft}{2} - 1,$$

and the second part B' of the frame ranges from sample $$\frac{Nfft}{2}$$

until sample Nfft−1 which is the last sample of the frame. It should be noted that this example is illustrated for a frame whose size is an even number since the most efficient application of the FFT/IFFT algorithms is realised for a number of samples that are a power of two. In case the frame has an odd number of samples, the principle is analogous with a minor correction in the time-domain sample indexing. The cyclic prefix size is not counted in this calculation.

The PAM-DMT frame in the time domain is oddly symmetrical or anti-symmetrical as described in "PAM-DMT for Intensity Modulated and Direct-Detection Optical Communication Systems", *IEE Photonics Technology Letters*, Vol. 21, no. 23, pp. 1749-1751, December 2009. This anti-symmetry is different than the one present in ACO-OFDM. In PAM-DMT, the subcarriers in the frequency domain are modulated with imaginary PAM symbols. This causes the bipolar (before clipping) time-domain PAM-DMT frame to possess a type of anti-symmetry termed odd symmetry. This means that if s[n] represents the samples of the time domain signal within one bipolar PAM-DMT frame and there are Nfft samples with n taking values between 0 and Nfft/2−1, then s[0]=s[Nfft/2]=0 and s[n]=−s[Nfft−n] for the rest of the frame. This means that the first half of the frame is oddly-symmetric to the second part of the frame. This can also be expressed as A[0]=B[0] and A[n]=−B[Nfft/2−n] where A indicates the first half of the frame with length Nfft/2 and indexed from n=0 to n=Nfft/2−1 and B indicates the second half of the frame with length Nfft/2 and indexed from n=0 to n=Nfft/2−1. We say that A and B are oddly-symmetric. This anti-symmetry (called odd symmetry) in time not only allows the negative samples to be removed without distortion as in conventional PAM-DMT, but also allows the addition of signal components which are evenly-symmetric and as such do not interfere with the PAM-DMT information signal. Even symmetry is defined as follows. If P is a frame or a part of a frame or a block of any number of samples with a length of Nfft/2 and indexed from n=0 to n=Nfft/2−1 then $\bar{P}$ is evenly-symmetric to P so P(0)=$\bar{P}$(0) and P(n)=$\bar{P}$(Nfft/2−n).

In FIG. 8, the two parts of each frame are denoted with the letters A' and B'. As a result of the properties of PAM-DMT, if the interference that falls on the part A' of the frame is evenly-symmetric to the interference that falls on part B' of the frame then, in the frequency domain, this interference will fall on the real components of the subcarriers and hence stay orthogonal to the useful information, which is modulated on the imaginary components. This property is exploited in the present embodiment in order to add additional information streams 210b, 210c to a PAM-DMT stream 210a without significant additional interference. An exemplary method for doing this is illustrated in FIG. 9. The principle is analogous the principle described above in relation to FIGS. 2 and 8. Furthermore, it will be appreciated that the example shown in FIG. 9 is only one possible example of how multiple information streams 210b, 210c could be added using the principles outlined herein. A person skilled in the art and familiar with the PAM-DMT structure, could be able to determine alternative stream arrangements in order to satisfy the required symmetry for stream orthogonality based only on the teachings of the present application and knowledge routine in the art. Nevertheless, the essence of the present embodiment is in exploiting the PAM-DMT frame structure by adding symmetric interference, so any alternative frame arrangements would simply be variations inspired by the current principle.

In the particular example shown in FIG. 9, a frame of the depth 1 information stream 210a representative of a given frame of the original bipolar signal is split into two parts, $A'_{1x}$ and $B'_{1x}$, with a cyclic prefix CP preceding the frame. In the depth 2 information stream 210b, a cyclic prefix CP and two frame parts $A'_{2x}$ then $B'_{2x}$ are provided during the transmission of the frame part $A'_{1x}$ of the depth 1 stream 210a and evenly-symmetric analogues $\bar{B}'_{2x}$, $\bar{A}'_{2x}$ of the two frame parts $B'_{2x}$, $A'_{2x}$ respectively and the cyclic prefix CP are provided in that order during transmission of the part $B'_{1x}$ of the depth 1 information stream 210a. In this way, the interference that falls on frame part $A'_{1x}$ of the depth 1 information stream 210a due to the depth 2 information stream 210b is evenly-symmetric to the interference that falls on frame part $B'_{1x}$ of the depth 1 information stream 210a, such that the interference remains orthogonal to the data encoded by $A'_{1x}$ and $B'_{1x}$ in the depth 1 information stream 210a and as such does not affect the data encoded in the stream at depth 1.

This process can also be extrapolated to information streams of higher depths. For example, in the depth 3 information stream 210c, a cyclic prefix CP followed by frame portions $A'_{3x}$ and $B'_{3x}$ are provided during transmission of the frame portion $A'_{2x}$ of the depth 2 information stream. Evenly symmetric analogues $\bar{A}'_{3x}$, $\bar{B}'_{3x}$ of the frame portions $A'_{3x}$ and $B'_{3x}$ and the cyclic prefix CP are provided in that order in the depth 3 transmission stream 210c during transmission of the $B'_{2x}$ frame of the depth 2 information stream 210b. The cyclic prefix CP followed by duplicates of the $B'_{3x}$ and $A'_{3x}$ portions of the depth 3 information stream 210c are provided in that order during transmission of the evenly symmetric analogue of the $B'_{2x}$ frame portion of the depth 2 information stream. The evenly symmetric analogues $\overline{B}'_{3x}$, $\overline{A}'_{3x}$ of the $B'_{3x}$ and $A'_{3x}$ portions of the depth 3 information stream 210c and the cyclic prefix CP are provided in that order during transmission of the evenly symmetric analogue of the $A'_{2x}$ frame of the depth 2 information stream 210a. Again, in this way, the interference that falls on the depth 1 and depth 2 information streams 210a, 210b due to the depth 3 information stream 210c remains orthogonal to the data encoded in the depth 1 and depth 2 information streams 210a, 210b and as such can be easily cancelled during the process of recovering the bipolar signal.

In order to determine the performance of the enhanced U-OFDM technique described above with respect to FIG. 2 in the context of a linear additive white noise Gaussian channel, a series of simulations have been performed. The only nonlinear effect included in the simulations is clipping of any negative values in the modulation signal due to the electrical characteristics of an ideal LED. Clipping of the modulation signal from below, is relevant to all devices. It cannot be avoided in a scheme such as DCO-OFDM due to the high peak-to-average power ratio (PAPR) of an OFDM signal which increases linearly with the number of active subcarriers in the frequency domain. The enhanced U-OFDM technique described above in relation to FIG. 2 is strictly positive and so completely avoids clipping of the signal from below.

Beneficially, the maximum modulation depth (i.e. the number of concurrent information streams used) is set to three in the simulation because this lessens the reduction in spectral efficiency from DCO-OFDM and U-OFDM but the smaller maximum modulation depth simplifies the apparatus and processing required. For example, if five (i.e. two extra) streams were used, the extra streams would provide only a small part (about 9%) of the spectral efficiency, while requiring significant additional energy. The additional energy required when five streams are used compared to the case when only three streams are used is in the order of 2-3 dB and it increases as the constellation size is increased. This arrangement can represent a bigger energy-saving potential by using enhanced U-OFDM (at the cost of a small portion of the spectral efficiency) compared to the use of five or more streams. Therefore, in the presented results that follow, the spectral efficiency of the enhanced U-OFDM method is actually 87.5% of the spectral efficiency of DCO-OFDM and U-OFDM. However, in real life situations, it will be appreciated that the use of the above enhanced U-OFDM technique can be tailored by providing more or less concurrent information streams to obtain a compromise between energy saved and spectral efficiency best suited to the particular application.

Figure 10:
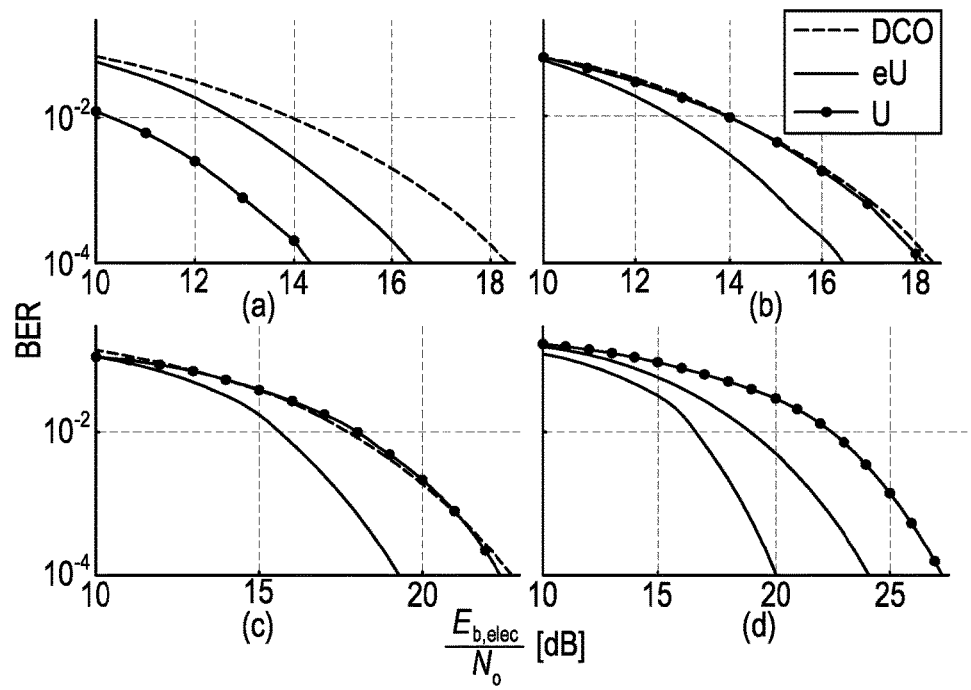
FIG. 10 is an illustration of a simulated comparative BER performance in terms of electrical signal to noise ratio of the method illustrated with respect to FIG. 2 against U-OFDM and DCO-OFDM for various M-QAM constellation sizes.

Simulations were carried out in order to compare the average bit error rate (BER) for the above enhanced U-OFDM technique with the BER obtained using DCO-OFDM and U-OFDM for different M-QAM constellation sizes. FIG. 10 shows the results as a function of the electrical signal to noise ratio for constellation sizes of M=[2, 4, 8, 16]. In particular, FIG. 10 shows the relative BER for the above enhanced U-OFDM method, conventional U-OFDM and DCO-OFDM for different M-QAM constellation sizes, wherein FIG. 10(*a*) shows the simulation results for BPSK, FIG. 10(*b*) shows the simulation results for 4-QAM, FIG. 10(*c*) shows the simulation results for 8-QAM and FIG. 10(*d*) shows the results for 16-QAM.

In U-OFDM, an actual constellation size of $M^2$ is employed for each respective value of M in order to ensure equal spectral efficiency between the three schemes. The simulation results are presented for BER values down around $10^{-3}$ to $10^{-4}$, as most forward error correction (FEC) codes would be able to deliver reliable communication for such BER values. It can be seen that the performance improvement of the enhanced U-OFDM technique described above over DCO-OFDM starts at around 2 dB for binary phase-shift keying (BPSK) and increases to about 4 dB for 16-QAM.

The simulations show that, for a maximum depth of D=3 (i.e. three concurrent information streams), the SNR penalty associated with the enhanced U-OFDM described above is approximately 1.95 dB. The SNR penalty is constant for all constellation sizes. Without wishing to be bound by theory, this could explain and quantify the increase in energy efficiency of the enhanced U-OFDM described above over DCO-OFDM with increase in the M-QAM modulation order. FIG. 10 also illustrates the loss in energy efficiency of U-OFDM as the spectral efficiency increases. In FIG. 10(*a*), 4-QAM U-OFDM is more energy-efficient than both BPSK enhanced U-OFDM and BPSK DCO-OFDM. However, in FIGS. 10(*b*) to 10(*c*), 16-QAM U-OFDM and 64-QAM U-OFDM are already less energy efficient than 4-QAM enhanced U-OFDM and 8-QAM enhanced U-OFDM, respectively, while at the same time exhibiting approximately the same performance as 4-QAM DCO-OFDM and 8-QAM DCO-OFDM. In FIG. 10(*d*), 256-QAM U-OFDM is clearly less energy efficient than both 16-QAM enhanced U-OFDM and 16-QAM DCO-OFDM.

In particular, the curves of FIG. 10 show that the performance obtained using the above enhanced U-OFDM technique gradually surpasses the performance obtained using U-OFDM as the spectral efficiency increases. Again, without wishing to be bound by theory, solving the issue with the loss in spectral efficiency in U-OFDM allows the use of smaller constellation sizes, which are more energy efficient. At the same time, it is apparent that the performance gap between the above enhanced U-OFDM technique and DCO-OFDM also gradually increases with the increase in the constellation size. It is postulated that this is due to the biasing required in order to avoid non-linear distortion increasing as the size of the constellation increases in DCO-OFDM. The higher biasing levels lead to more energy dissipation.

Figure 12:
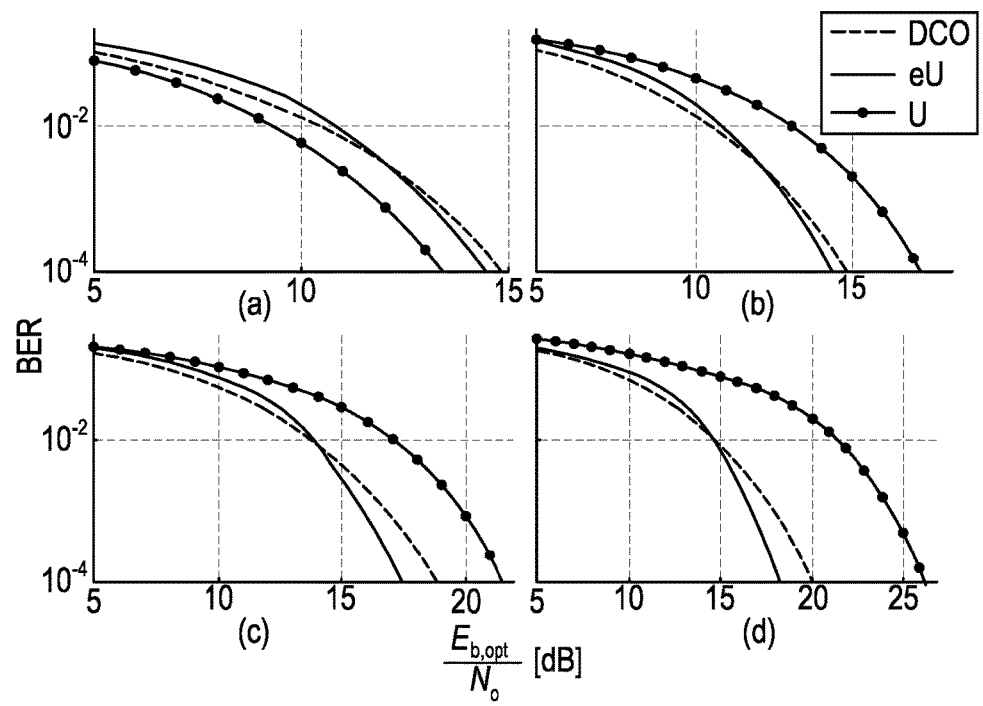
FIG. 12 is an illustration of a simulated comparative BER performance in terms of optical signal to noise ratio of the method illustrated with respect to FIG. 2 against U-OFDM and DCO-OFDM for various M-QAM constellation sizes.

FIG. 12 illustrates the same performance trends for all three schemes as a function of the optical SNR. For BPSK and 4-QAM, enhanced U-OFDM has an efficiency advantage of about 0.5 dB over DCO-OFDM. This advantage reaches almost 2 dB for 16-QAM. At the same time, U-OFDM shows advantage only for a constellation size of M=4 against BPSK enhanced U-OFDM/DCO-OFDM in FIG. 12(*a*).

Figure 11:
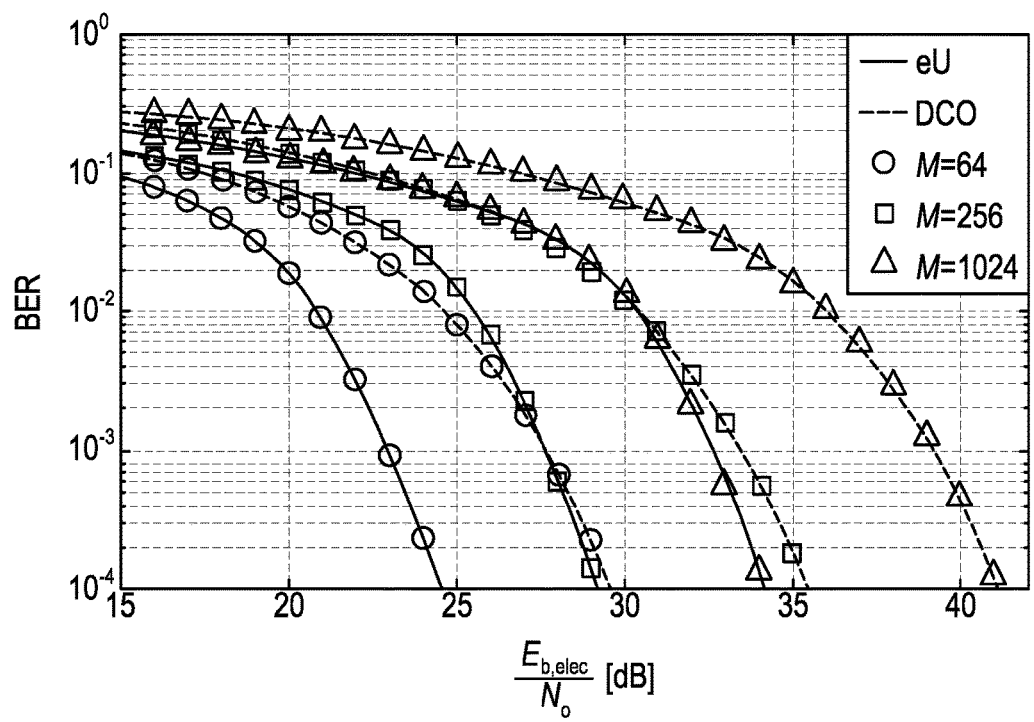
FIG. 11 is an illustration of a simulated comparative BER performance in terms of electrical signal to noise ratio of the method illustrated with respect to FIG. 2 against DCO-OFDM for various M-QAM constellation sizes.

A performance comparison between enhanced U-OFDM and DCO-OFDM has also been conducted for higher spectral efficiencies using simulations. Results for M=[64, 256, 1024] are presented in FIG. 11 and FIG. 13. U-OFDM is neglected in this study as it has already been shown that it loses its energy advantage over both enhanced U-OFDM and DCO-OFDM for 256-QAM U-OFDM versus 16-QAM enhanced U-OFDM/DCO-OFDM. The results presented in FIG. 11 and FIG. 13 indicate that for 1024-QAM, enhanced U-OFDM could attain savings of around 7 dB in electrical energy dissipation over DCO-OFDM and savings of around 3 dB in required optical power, which could make a significant difference in future high-speed optical wireless communications systems. Again, enhanced U-OFDM is clearly more energy efficient than DCO-OFDM and the improvement in efficiency increases with the increase in the constellation size.

Figure 13:
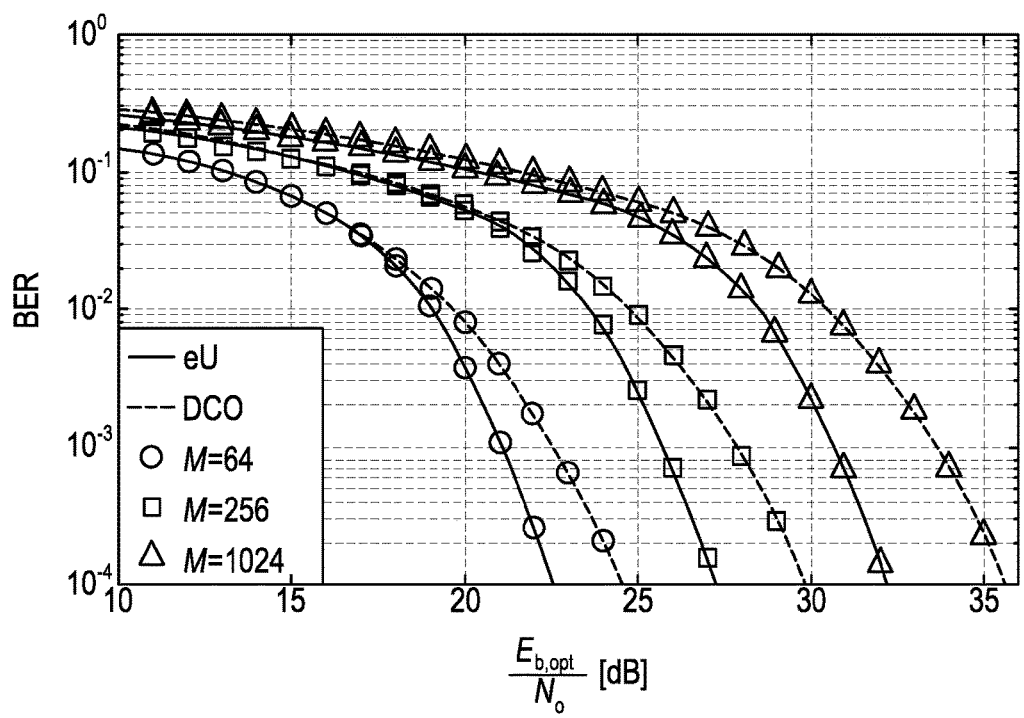
FIG. 13 is an illustration of a simulated comparative BER performance in terms of optical signal to noise ratio of the method illustrated with respect to FIG. 2 against DCO-OFDM for various M-QAM constellation sizes.
Figure 14:
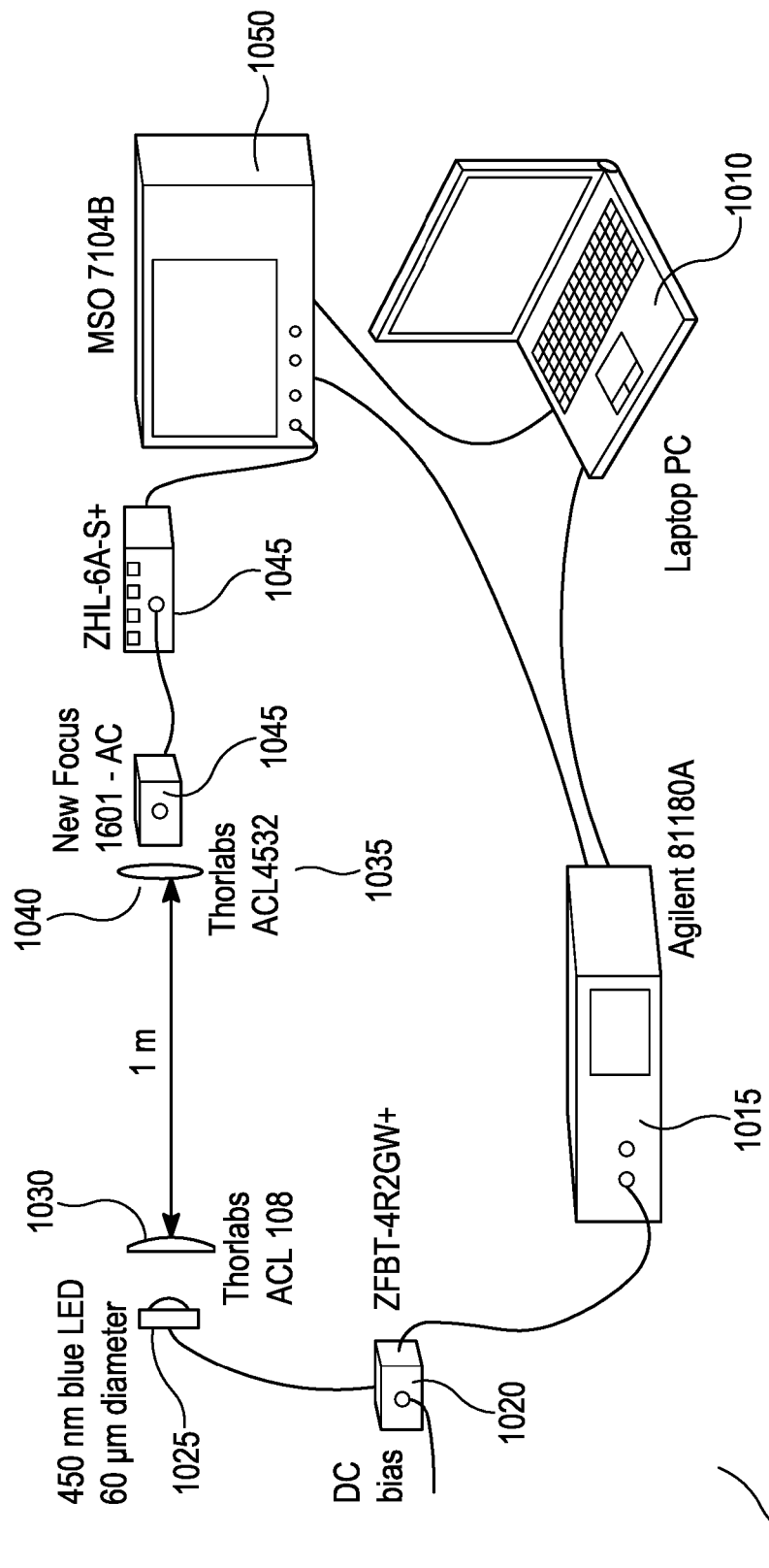
FIG. 14 is a schematic of an example apparatus used to determine relative electrical and optical power dissipation between the method illustrated with respect to FIG. 2, U-OFDM and DCO-OFDM for various M-QAM constellation sizes.
Figure 15:
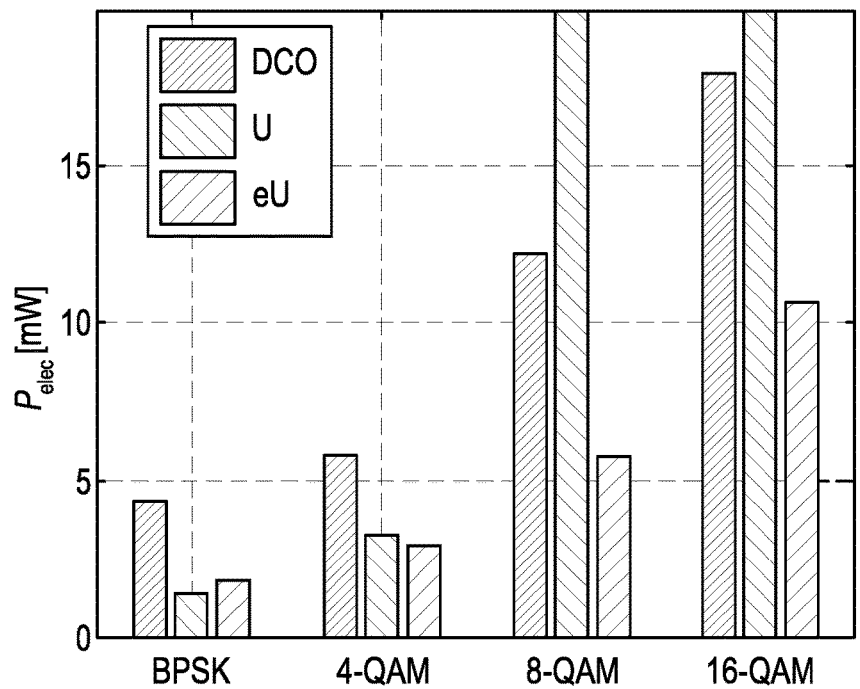
FIG. 15 illustrates the relative electrical power dissipation between the method illustrated with respect to FIG. 2, U-OFDM and DCO-OFDM for various M-QAM constellation sizes obtained using the apparatus of FIG. 14.
Figure 16:
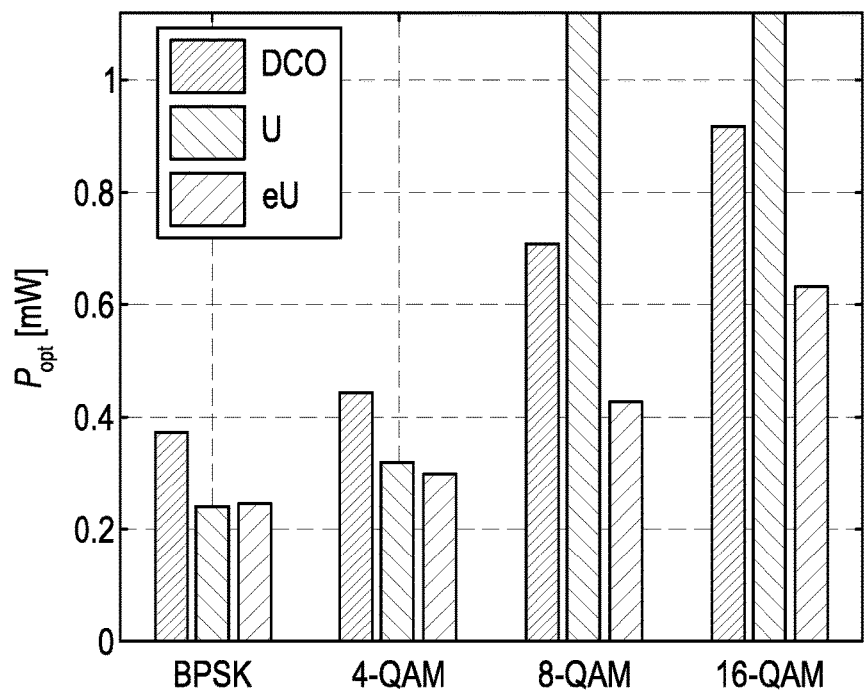
FIG. 16 illustrates the relative optical power dissipation between the method illustrated with respect to FIG. 2, U-OFDM and DCO-OFDM for various M-QAM constellation sizes obtained using the apparatus of FIG. 14.

The simulation results shown in FIGS. 10 to 13 were verified by implementing the three schemes, i.e. the enhanced U-OFDM technique described above in relation to FIG. 2, conventional U-OFDM and DCO-OFDM, using apparatus 1005 shown in FIG. 14.

Using this apparatus 1005 of FIG. 12, a discrete OFDM, U-OFDM or enhanced U-OFDM signal, as appropriate, is generated on an appropriate processing device 1010 using a series of steps that include: random bit generation, M-QAM modulation, IFFT, oversampling, and pulse shaping. In U-OFDM and enhanced U-OFDM, the pulse shaping is performed after the positive and the negative frame are generated, but before any negative values are removed. The discrete time samples of the OFDM, U-OFDM or enhanced U-OFDM signal, as appropriate, are passed to an arbitrary waveform generator (AWG) 1015, which performs digital-to-analog conversion with a 12-bit zero-order-hold digital-to-analog converter (DAC), and outputs an analog waveform used to modulate an LED 1025. The AWG 1015 has a DC-coupled output amplifier with a maximum voltage swing of 2V and a maximum output DC offset of 1.5V. The LED 1025 has a turn-on voltage of almost 3V. Therefore, in order to fit the information signal within the active range of the LED 1025, additional bias is added to the information signal via a bias-T 1020. The output of the bias-T 1020 directly modulates the voltage over the LED 1025. The light emitted from the LED 1025 is collimated via an aspheric lens 1030, and directed towards the receiver 1035. At the receiver site, an aspheric lens 1040 collects the received light and focuses it on a positive-intrinsic-negative (PIN) photodetector 1045. The photodetector 1045 outputs a continuous analog signal which is amplified via an off-the-shelf amplifier and passed to a suitable display device 1050, such as a digital oscilloscope. The display device 1050 in this example performs digital to analog conversion with a 12-bit analog-to-digital converter (ADC). The digitized signal is retrieved from the display device 1050 by the processing device 1010 and processed through a series of steps that include: synchronization, matched filtering, downsampling, FFT, channel estimation, equalization, and M-QAM demodulation.

The relevant OFDM parameters used to collect the experimental data are: 1) an FFT size Nfft=1024, of which only 511 subcarriers are modulated with unique information due to the requirement to impose Hermitian symmetry in the frequency domain in order to generate a real time-domain OFDM signal; 2) cyclic prefix length of Ncp=5; 3) single-sided communication bandwidth of B=20 MHz over which the frequency response of the LED is flat; 4) digital clipping of the OFDM signal at $-4\sigma$s and $4\sigma$s, where as is the standard deviation of the time-domain OFDM signal, in order to limit very high peaks, typical for the OFDM signal; a range of $[-4\sigma; 4\sigma]$ encompasses more than 99.99% of the signal distribution, which allows the assumption that the signal generation procedure does not contribute to the non-linear distortion observed in the system; in U-OFDM and enhanced U-OFDM, every information stream is clipped at $[0; 4\sigma]$; 5) root-raised cosine (RRC) pulse shaping with an oversampling factor of 4 and a roll-off factor of 0.1.

The experimental apparatus shown in FIG. 12 was used to generate results from an actual implementation of the three schemes (i.e. enhanced U-OFDM as described above with reference to FIG. 2, conventional U-OFDM and DCO-OFDM) using the same experimental setup, as described above. The results are shown in FIGS. 13 and 14. These show that enhanced U-OFDM can be implemented in practice with the bare minimum in terms of biasing (just enough to turn on the LED). The results also demonstrate the same performance trend when comparing the three schemes, namely U-OFDM, enhanced U-OFDM and DCO-OFDM as those obtained from the simulations and theoretical analysis shown in FIGS. 10 to 13.

The results presented in FIGS. 13 and 14 have been measured for an achieved target BER<$2\times10^{-3}$. Typical forward error correction (FEC) codes can guarantee reliable communication at this BER. These results show that 4-QAM U-OFDM is more power efficient than both BPSK enhanced U-OFDM and DCO-OFDM in terms of electrical and optical power dissipation. The difference to enhanced U-OFDM is less than 1 dB in electrical power and very close to 0 dB in optical power. Both enhanced U-OFDM and conventional U-OFDM show more than 3 dB improvement in terms of electrical power requirement and almost 2 dB improvement in terms of optical power requirement compared with DCO-OFDM. 16-QAM U-OFDM is also almost equivalent in performance to 4-QAM enhanced U-OFDM but, for this constellation size, enhanced U-OFDM is slightly better with an electrical power requirement that is approximately 0.5 dB lower and an optical power requirement that is approximately 0.3 dB lower. Both the enhanced U-OFDM and U-OFDM schemes clearly exhibit better performance than DCO-OFDM technique with nearly 3 dB lower electrical power requirement and around 1.5 dB lower optical power requirement. 8-QAM enhanced U-OFDM exhibits more than 3 dB improvement over DCO-OFDM in electrical power dissipation and more than 2 dB improvement in optical power dissipation. U-OFDM with a constellation size of M≥64 could not be realized within the FEC BER due to the nonlinear distortion. The nonlinear pre-distortion procedure does not appear to be beneficial when the information signal has values higher than approximately 4.5V. This could be explained by the fact that the nonlinearity in the upper part of the LED active region is not memory-less and a more sophisticated pre-distortion procedure would be required. For 16-QAM, enhanced U-OFDM is again more energy efficient than DCO-OFDM with over 2 dB of electrical power improvement and over 1.5 dB of optical power improvement.

The voltage modulator of the LED could be replaced with a current modulating circuit in order to reduce detrimental effects due to non-linear distortions, particularly in the enhanced U-OFDM techniques. Any droop in output efficiency of the LED could be reduced with appropriate heat-sinking techniques. Furthermore, the issue of efficiency drooping in LEDs for higher current densities suggests that energy efficient implementations, both for communication and illumination applications, are likely to benefit from a system configuration with multiple LEDs operated in parallel at the lower end of their active region. This could resolve the nonlinearity issue for enhanced U-OFDM as it would allow the light signal levels to scale linearly with the number of output devices without further nonlinear effects.

In conclusion, the measurements prove that the enhanced U-OFDM concept described above in relation to FIG. 2 delivers energy efficiency. Of note, the performance trend for the actual experimental results is clearly very similar to that obtained from the theoretical results. For the low spectral efficiencies (e.g. BPSK), U-OFDM is the most efficient. As the spectral efficiency increases (e.g. for 4-QAM and upwards), the enhanced U-OFDM becomes the most efficient scheme while U-OFDM loses its benefits.

It will be appreciated that the above principles for improving the spectral efficiency of energy efficient bipolar to unipolar modulation schemes could be applied before and/or after any pulse shaping operations. In addition, the present invention could be applied to the digital and/or the analogue domain. Furthermore, a number of processing steps of the present invention could be realised either in the frequency or in the time domain by a person skilled in the art.

Furthermore, although specific configurations of information stream based on various modulation schemes (such as U-OFDM, ACO-OFDM and PAM-DMT) are described, it will be appreciated that the present invention is not limited to these specific examples, and a skilled person could be led by the present application to other ways of selecting and/or arranging the frames or frame portions within the information streams or to base the method on other modulation schemes that would achieve an advantageous effect using the present principle of arranging the further information streams in such a way that an operation or symmetry of the modulation scheme used to convert between bipolar and unipolar signals would result in the interference between at least some of the information streams being orthogonal to the carried data, such that the interference resulting from the additional information streams cancels and does not significantly impact on the signal quality. In this way, a transmission scheme can be provided that has a higher energy efficiency than DCO-OFDM and a higher spectral efficiency than other bipolar or unipolar modulation schemes such as U-OFDM, ACO-OFDM and PAM-DMT.

In addition, although the above methods and apparatus are advantageously described in terms of an optical wireless communications system, it will be appreciated that the above techniques and principles are also applicable to other communications systems, such as microwave, radio frequency, or other electromagnetic or sonic communications techniques or any other communication system which might benefit from the use of unipolar signals.

Furthermore, although the above example advantageously applies OFDM to a M-QAM modulation scheme, it will be appreciated that the OFDM technique could equally be applied to other modulation schemes.

In addition, it will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits), FPGAs (field programmable gate arrays) or GPUs (graphic processing units)) or by a mix of hardware and software.

Furthermore, whilst the above describes transmitters and receivers, it will be appreciated that both transmitter and receivers may be provided in a single device, such as a mobile communications device, so that two way communications using the present system are possible.

As such, it should be understood that the embodiments described herein are merely exemplary and that various modifications may be made thereto without departing from the scope of the present invention.

The invention claimed is:

1. A transmission apparatus configured to at least one of produce, generate, or transmit a unipolar signal representative of an original bipolar signal comprising one or more data frames, wherein the transmission apparatus comprises:
    a processor configured to split the original bipolar signal into the one or more data frames and to convert each of the one or more data frames of the original bipolar signal into a plurality of unipolar portions, frames or frame portions of one or more information streams; and
    at least one transmitter element configured to concurrently transmit the one or more information streams and at least one other information stream using at least one of: the same frequency, the same link, the same channel, or the same at least one transmitter element,
    wherein one or more of the information streams are arranged such that the interference due to the at least one other information stream on the at least one information stream at least one of does not adversely affect or does not prohibit at least one of the reading or recovery of the information carried in the at least one information stream.

2. The transmission apparatus of claim 1, wherein one or more of the information streams are arranged such that the one or more information streams is/are at least one of obtainable, recoverable or extractable from the plurality of concurrently transmitted information streams.

3. The transmission apparatus of claim 1, wherein the transmission apparatus is a non-MIMO transmission apparatus.

4. The transmission apparatus of claim 3, wherein the transmission apparatus comprises, or is operable to transmit the information streams using, only a single transmitter element or transmission channel or link.

5. The transmission apparatus of claim 1, wherein at least one of a symmetry, arrangement or content of the portions, frames or frame portions of the at least one other information stream are such that the interference due to the at least one other information stream on the at least one information stream does not adversely affect, and/or does not prohibit at least one of the reading or recovery of, the information carried in the at least one information stream.

6. The transmission apparatus of claim 5, wherein at least one of the symmetry, arrangement, or content of the portions, frames or frame portions of the at least one other information stream are such that the interference due to the at least one other information stream is arranged to be orthogonal, or is orthogonal to the at least one information stream and/or is arranged to cancel in subsequent processing.

7. The transmission apparatus of claim 1, wherein the plurality of portions, frames or frame portions of the information stream are processable to obtain the corresponding frame(s) of the original signal.

8. The transmission apparatus according to claim 7, wherein the plurality of information streams are arranged such that at least part of the interference to the portions, frames or frame portions of an information stream caused by at least one other information stream is cancelled or removed or removable by the processing operation used to obtain the corresponding frames of the original signal from the plurality of frames of the information stream.

9. The transmission apparatus according to claim 1, wherein the frames, frame portions or portions of the at least one other information stream that are transmitted during transmission of one or more portions, frames or frame portions of the at least one information stream corresponding to a given frame of the original signal are the same as, inverse to, symmetrical to, evenly symmetrical to, symmetrical-in-time to, anti-symmetrical to, oddly-symmetrical to, or anti-symmetrical-in-time to the frames, frame portions or portions of the at least one other information stream transmitted during the transmission of each of the other portions, frames or frame portions of the information stream(s) that correspond to that given frame of the original signal.

10. The transmission apparatus according to claim 1, wherein the transmission apparatus is configured to encode one or more frames of the original signal using the other information stream(s).

11. The transmission apparatus according to claim 10, wherein the number of portions, frames or frame portions of one or more information streams used to encode a frame of the original signal is greater than the number of portions, frames or frame portions of at least one other information stream used to encode a frame of the original signal.

12. The transmission apparatus according to claim 11, wherein a frame of the original signal is encoded in two portions, frames or frame portions of a first information stream and a second information stream encodes a frame of the original signal using four portions, frames or frame portions of the second information stream.

13. The transmission apparatus according to claim 1, wherein the frames of the original signal are encoded using a U-OFDM method, an ACO-OFDM method, a PAM-DMT method or a Flip-OFDM method to produce one or more of the information streams.

14. The transmission apparatus according to claim 13, wherein one or more frames of the original signal are respectively split into one or more first frames and one or more second frames of the information stream(s), wherein either the first or second frames comprise a positive frame in which the positive time domain samples of the respective frame from the original signal are held or maintained and the negative time domain samples are clipped and the other of the first or second frames comprise a negative frame in which the absolute values of the negative time domain samples of the respective frame from the original signal are held or maintained and the positive time domain samples are clipped.

15. The transmission apparatus according to claim 1, wherein the other information stream(s) comprise one or more duplicates of at least one portion, frame or frame portion of the other information stream.

16. The transmission apparatus of claim 15, wherein the number of duplicates of each portion, frame or frame portion varies between information streams.

17. The transmission apparatus according to claim 14, wherein for each information stream, either:
at least one of a second portion, frame or frame portion or a cyclic prefix associated with the second portion, frame or frame portion follows at least one of a first portion, frame or frame portion; or
at least one of a first portion, frame or frame portion or a cyclic prefix associated with the first portion, frame or frame portion follows at least one of a second portion, frame or frame portion.

18. The transmission apparatus according to claim 1, wherein the transmission apparatus is configured to transmit one or more frame pairs of the at least one other information stream, wherein each frame pair comprises a first and a second portion, frame or frame portion of the at least one other information stream.

19. The transmission apparatus according to claim 18, wherein at least one frame pair of at least one other information stream that is transmitted during transmission of at least a first portion, frame or frame portion of the at least one information stream that corresponds to a given frame of the original signal is the same as, inverse to, symmetrical to, evenly symmetrical to, symmetrical-in-time to, anti-symmetrical to, oddly-symmetrical to, or anti-symmetrical-in-time to at least one frame pair of the at least one other information stream that is transmitted during transmission of at least one and preferably each other portion, frame or frame portion of the at least one information stream that corresponds to that given frame of the original signal.

20. The transmission apparatus according to claim 1, wherein the transmission apparatus is or comprises optical wireless transmission apparatus.

21. The transmission apparatus according to claim 1, wherein the different information streams are transmitted simultaneously on the same channel/link.

22. A receiver system configured for receiving a plurality of concurrently transmitted unipolar information streams from a transmission apparatus according to claim 1, the receiver system comprising:
at least one receiver element configured to receive the plurality of concurrently transmitted unipolar information streams, wherein the plurality of concurrently transmitted unipolar information streams are concurrently transmitted using at least one of: the same frequency, the same link, the same channel, or the same at least one transmitter element; and
a processor configured to convert at least one of the unipolar information streams into a bipolar signal.

23. The receiver system according to claim 22, wherein the receiver system is configured to recover an original bipolar signal represented by the plurality of unipolar information streams.

24. The receiver system according to claim 22, wherein the receiver system is configured to combine or otherwise process two or more portions, frames or frame portions of at least one of the received information streams in order to derive a frame of an original bipolar signal.

25. The receiver system according to claim 22, wherein the receiver system is configured to re-convert one or more portions of the original signal back into at least one unipolar information stream and subtract one or more of the recovered unipolar information streams from the received signal that comprises a plurality of information streams.

26. A communications system comprising:
a transmission apparatus according to claim 1; and
a receiver system configured for receiving a plurality of concurrently transmitted unipolar information streams from the transmission apparatus, the receiver system comprising:
at least one receiver element configured to receive the plurality of concurrently transmitted unipolar information streams, wherein the plurality of concurrently transmitted unipolar information streams are concurrently transmitted using at least one of: the same frequency, the same link, the same channel, or the same at least one transmitter element; and
a processor configured to convert at least one of the unipolar information streams into a bipolar signal.

27. A device comprising:
a communications system, wherein the communications system comprises transmission apparatus of claim 1; and
a receiver system configured for receiving a plurality of concurrently transmitted unipolar information streams from the transmission apparatus, the receiver system comprising:
at least one receiver element configured to receive the plurality of concurrently transmitted unipolar information streams, wherein the plurality of concurrently transmitted unipolar information streams are concurrently transmitted using at least one of: the same frequency, the same link, the same channel, or the same at least one transmitter element; and a processor configured to convert at least one of the unipolar information streams into a bipolar signal.

28. The device of claim 27, wherein the device is or comprises at least one of a fixed transmitter, a receiver unit, a system, or a mobile communications device.

29. The device of claim 27, wherein the communications system comprises an optical wireless communications system.

30. A transmission method comprising the steps of:
at least one of producing, generating, or transmitting a signal representative of an original bipolar signal comprising one or more data frames, wherein each of the one or more frames of the original bipolar signal is converted, via a processor, into a plurality of unipolar portions, frames or frame portions of one or more information streams;
concurrently transmitting, via at least one transmitter element, the one or more information streams and at least one other information stream using at least one of: the same frequency, the same link, the same channel, or the same at least one transmitter element; and
arranging one or more of the information streams such that the interference due to the at least one other information stream on the at least one information stream does not adversely affect the information carried in the at least one information stream.

31. The method of claim 30, comprising transmitting different information streams simultaneously on the same channel/link.

32. The method of claim 31, comprising transmitting different information streams at least one of using a non-MIMO transmission apparatus or using only a single transmitter element, transmission channel or link.

33. The method of claim 30, comprising arranging one or more of the information streams such that the one or more information streams is/are at least one of obtainable, recoverable or extractable from the plurality of concurrently transmitted information streams.

34. The method of claim 30, wherein a symmetry, and/or arrangement, or content of the portions, frames or frame portions of the at least one other information stream are such that the interference due to the at least one other information stream on the at least one information stream does not adversely affect the information carried in the at least one information stream.

35. The method of claim 30, wherein a symmetry, arrangement, or content of the portions, frames or frame portions of the at least one other information stream are such that the interference due to the at least one other information stream is arranged to be orthogonal, or is orthogonal to the at least one information stream and/or is arranged to cancel in subsequent processing.

36. The method of claim 30, wherein the plurality of portions, frames or frame portions of the information stream are processable to obtain the corresponding frame(s) of the original bipolar signal and the method comprises arranging the plurality of information streams such that at least part of the interference to the portions, frames or frame portions of an information stream caused by at least one other information stream is cancelled or removed or removable by the processing operation used to obtain the corresponding frames of the original bipolar signal from the plurality of frames of the information stream.

37. The method of claim 30, wherein the frames, frame portions or portions of the at least one other information stream that are transmitted during transmission of one or more portions, frames or frame portions of the at least one information stream corresponding to a given frame of the original bipolar signal are the same as, inverse to, symmetrical to, evenly symmetrical to, symmetrical-in-time to, anti-symmetrical to, oddly-symmetrical to, or anti-symmetrical-in-time to the frames, frame portions or portions of the at least one other information stream transmitted during the transmission of each of the other portions, frames or frame portions of the information stream(s) that correspond to that given frame of the original bipolar signal.

38. The method of claim 30, wherein the method comprises use of a transmission apparatus configured to at least one of produce, generate or transmit a unipolar signal representative of the original bipolar signal comprising one or more data frames, wherein:
each of the one or more frames of the original bipolar signal are at least one of converted into, or transmitted as, a plurality of unipolar portions, frames or frame portions of one or more information streams; and
the transmission apparatus is configured to concurrently transmit the one or more information streams and at least one other information stream.

39. A computer program product comprising at least one non-transitory computer-readable storage medium having computer-readable program code portions embodied therein, the computer-readable program code portions comprising one or more executable portions configured such that, when run on a suitable processing device, causes the processing device to implement the method of claim 30.

40. A carrier medium comprising or carrying the computer program product of claim 39.

41. A processing or computational apparatus when loaded with the computer program product of claim 39.

42. A method for at least one of receiving, decoding or recovering a signal from a plurality of concurrently transmitted unipolar information streams, wherein the plurality of concurrently transmitted unipolar information streams are concurrently transmitted using at least one of: the same frequency, the same link, the same channel, or the same at least one transmitter element, the method comprising the step of combining or otherwise processing, via a processor, two or more portions, frames or frame portions of at least one of the received information streams in order to derive a frame of an original bipolar signal, wherein the method comprises re-converting at least one or more portions of the original bipolar signal back into at least one unipolar information stream and subtracting one or more of the recovered unipolar information streams from a received signal that comprises a plurality of information streams.

43. The method of claim 42, wherein the information streams are or comprise information streams transmitted by a transmission apparatus configured to at least one of produce, generate, or transmit a unipolar signal representative of an original bipolar signal comprising one or more data frames, wherein the transmission apparatus comprises:
a processor configured to split the original bipolar signal into the one or more data frames and to convert each of the one or more data frames of the original bipolar signal into a plurality of unipolar portions, frames or frame portions of one or more information streams; and
at least one transmitter element configured to concurrently transmit the one or more information streams and at least one other information stream using at least one of: the same frequency, the same link, the same channel, or the same at least one transmitter element,
wherein one or more of the information streams are arranged such that the interference due to the at least one other information stream on the at least one information stream at least one of does not adversely affect or does not prohibit at least one of the reading or recovery of the information carried in the at least one information stream.

* * * * *